United States Patent
Thakkar et al.

(10) Patent No.: US 11,269,947 B2
(45) Date of Patent: *Mar. 8, 2022

(54) METHOD AND SYSTEM FOR PROVIDING A FEDERATED WIDE AREA MOTION IMAGERY COLLECTION SERVICE

(71) Applicant: PIXIA CORP., Reston, VA (US)

(72) Inventors: Rahul C. Thakkar, Leesburg, VA (US); Michael L. Maraist, Fairfax, VA (US)

(73) Assignee: PIXIA CORP., Herndon, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/100,614

(22) Filed: Nov. 20, 2020

(65) Prior Publication Data

US 2021/0073265 A1    Mar. 11, 2021

Related U.S. Application Data

(63) Continuation of application No. 16/526,480, filed on Jul. 30, 2019, now Pat. No. 10,866,983, which is a
(Continued)

(51) Int. Cl.
| | |
|---|---|
| *G06F 16/51* | (2019.01) |
| *H04L 29/08* | (2006.01) |
| *G06F 16/27* | (2019.01) |
| *G06F 16/29* | (2019.01) |
| *G06F 16/71* | (2019.01) |

(Continued)

(52) U.S. Cl.
CPC ............. *G06F 16/51* (2019.01); *G06F 16/27* (2019.01); *G06F 16/29* (2019.01); *G06F 16/434* (2019.01); *G06F 16/71* (2019.01); *H04L 67/16* (2013.01)

(58) Field of Classification Search
CPC ........ G06F 16/27; G06F 16/29; G06F 16/434; G06F 16/51; G06F 16/71; H04L 67/16
See application file for complete search history.

(56) References Cited

U.S. PATENT DOCUMENTS

| | | | |
|---|---|---|---|
| 8,290,346 B2 | 10/2012 | Ernst | |
| 8,804,005 B2 * | 8/2014 | Mei ........................ | G11B 27/28 348/231.2 |

(Continued)

OTHER PUBLICATIONS

Notice of Allowance issued in corresponding U.S. Appl. No. 16/526,480 dated Aug. 17, 2020 (9 pages).

*Primary Examiner* — Mohamed A. Wasel
*Assistant Examiner* — Patrick F Ngankam
(74) *Attorney, Agent, or Firm* — Kilpatrick Townsend & Stockton, LLP

(57) ABSTRACT

This disclosure relates to WAMI discovery, specifically including: issuing a first request to a WAMI federated collection service (FCS) to retrieve WAMI collection metadata, the WAMI FCS being in communication with a WAMI collection service (CS), each WAMI CSs being in communication with a location where WAMI data is stored; receiving a response in a first format from the WAMI FCS;
(Continued)

translating the received WAMI collection metadata from the first format into another format; issuing a second request to the WAMI FCS to access WAMI data in the other format; and retrieving in response to the second request, the WAMI data in the other format from the location that corresponds to a network link.

18 Claims, 21 Drawing Sheets

Related U.S. Application Data continuation of application No. 16/175,228, filed on Oct. 30, 2018, now Pat. No. 10,387,483, which is a continuation of application No. 15/850,069, filed on Dec. 21, 2017, now Pat. No. 10,169,375, which is a continuation of application No. 15/612,731, filed on Jun. 2, 2017, now Pat. No. 9,881,029, which is a continuation of application No. 13/784,726, filed on Mar. 4, 2013, now Pat. No. 9,703,807.

(60) Provisional application No. 61/735,538, filed on Dec. 10, 2012.

(51) Int. Cl.
*G06F 16/432* (2019.01)
*H04L 67/51* (2022.01)

(56) References Cited

U.S. PATENT DOCUMENTS

| | | |
|---|---|---|
| 2007/0249368 A1 | 10/2007 | Bailly et al. |
| 2007/0299804 A1 | 12/2007 | Liu et al. |
| 2008/0198159 A1* | 8/2008 | Liu .................. G08B 13/19641 345/420 |
| 2008/0215581 A1* | 9/2008 | Messing ................. G06Q 30/02 |
| 2009/0210277 A1* | 8/2009 | Hardin ............ G06Q 10/06313 705/7.23 |
| 2011/0085033 A1 | 4/2011 | Mcdonald et al. |
| 2011/0115915 A1 | 5/2011 | Velusamy |
| 2011/0234796 A1* | 9/2011 | Taber ....................... H04N 7/18 348/144 |
| 2012/0179678 A1 | 7/2012 | Irie et al. |
| 2012/0233228 A1 | 9/2012 | Barton et al. |
| 2012/0233293 A1 | 9/2012 | Barton et al. |
| 2012/0233522 A1 | 9/2012 | Barton et al. |
| 2013/0040660 A1* | 2/2013 | Fisher ..................... G06F 16/58 455/456.1 |
| 2013/0219036 A1 | 8/2013 | Gusev et al. |

* cited by examiner

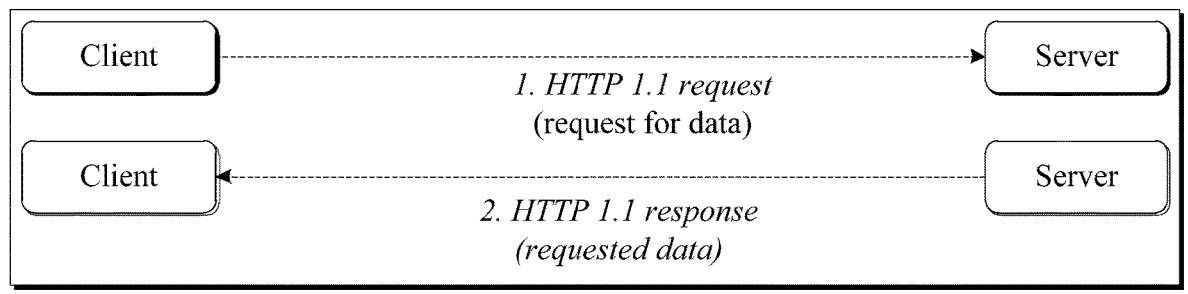
FIG. 1 (CONVENTIONAL)

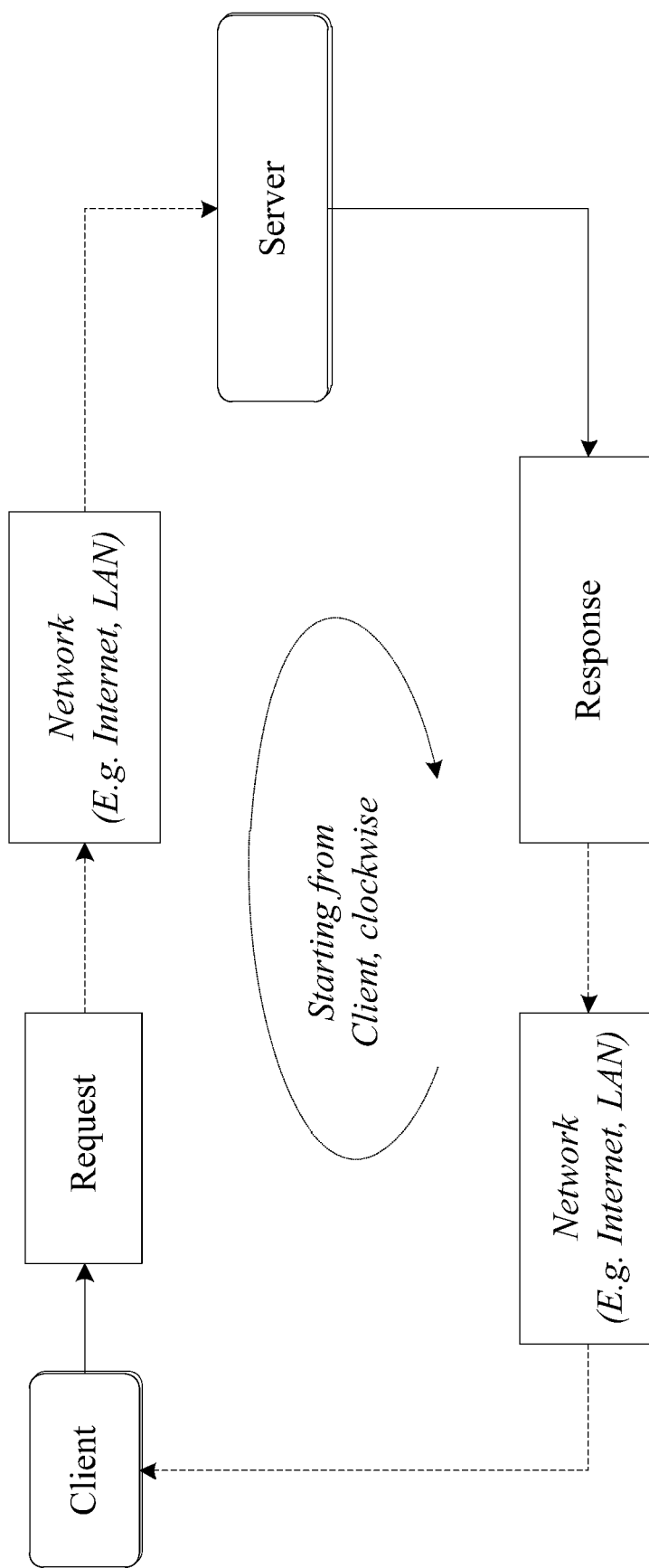
FIG. 2 (CONVENTIONAL)

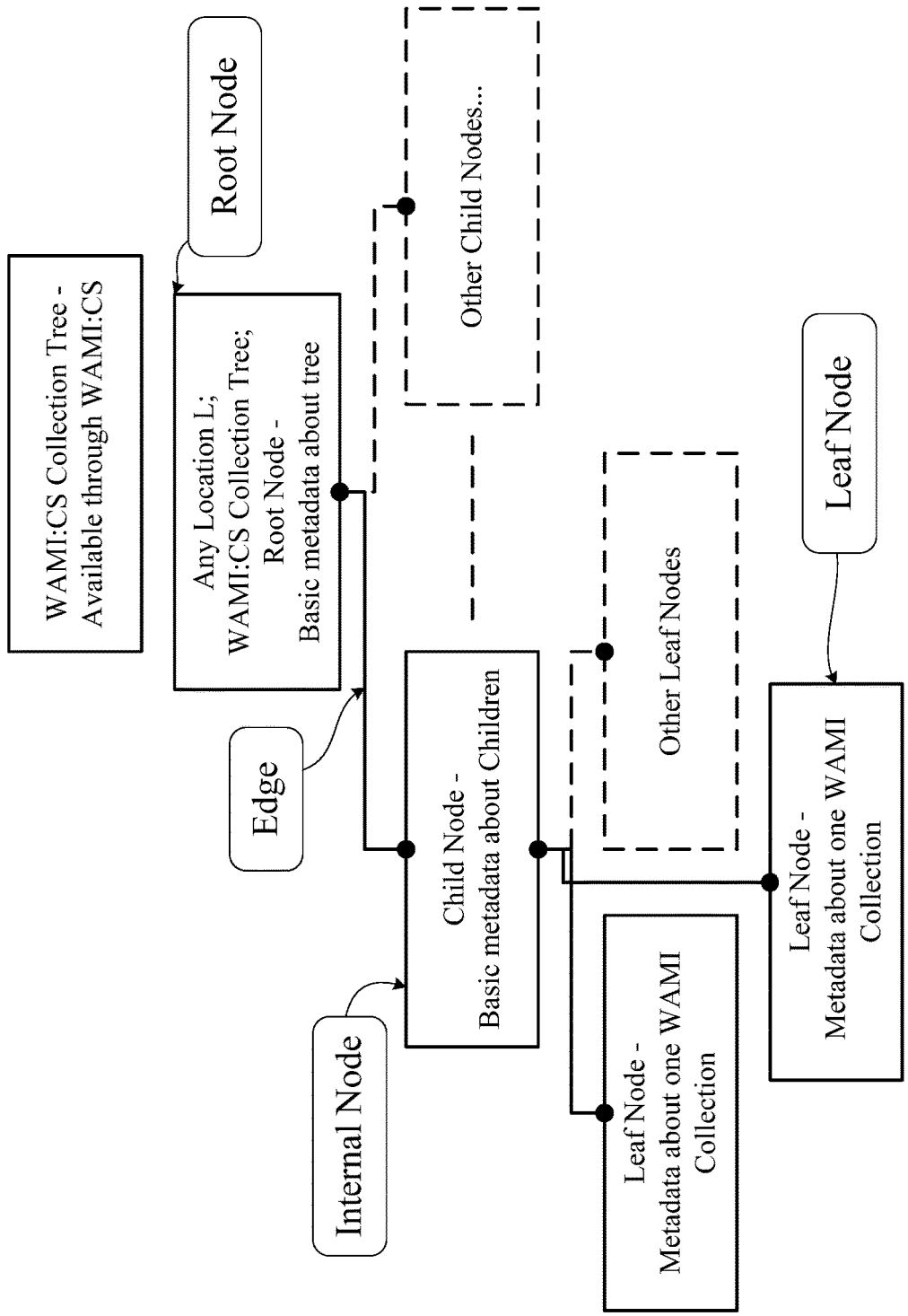
FIG. 17 (CONVENTIONAL)

| Symbol | Meaning: Detail |
|---|---|
| •—• | Graph connector: A singularly initiated bi-directional HTTP or HTTPS link |
| ◄---► | Data flow: Bi-directional data flow indicator. For example, an HTTP client program sends a request to an HTTP server program and receives a response from the server program. |
| C | Client Program (WAMI:C) or Application: runs on a computer system that has the requirement that is fulfilled by a web service offered by a server program on a computer network. |
| I | WAMI Ingest service (WAMI:I): A set of one or more computer programs acting together as a web service to ingest WAMI data and prepare data for other web services that disseminate WAMI data. |
| VS | WAMI Video service (WAMI:VS): A web service that takes one or more areas of interest from one or more individual WAMI frames from one or more WAMI collections, processes and formats these AOIs, and transmits these AOIs over a computer network, to an interested client program C, as a video stream, in a format that is supported by the WAMI Video service and is of C's choosing. |
| IS | WAMI Image service (WAMI:IS): A web service that takes area(s) of interest from individual WAMI frame(s) from one or more WAMI Collections, processes and formats these AOIs, and transmits these AOIs over a computer network, to an interested client program C, as a video stream, in a format that is supported by the WAMI IS and is of C's choosing. The service also provides per-frame metadata regarding one or more WAMI Image frames from one or more WAMI Collections. |
| FCS | WAMI Federated Collection Service (WAMI:FCS): a web service that acts as a single point of entry for a client program, and provides the same functional interface as a WAMI Collection Service. From this single entry point, an FCS provides a transparent connection to a hierarchy of existing WAMI Collection Service implementations, and one or more other FCS. Therefore, an FCS provides federated access to local or remote WAMI Collection Service and FCS instances. An FCS implements the same HTTP/HTTPS web service specification as a WAMI Collection Service. |
| CS | WAMI Collection Service (WAMI:CS): A web service that implements an HTTP or HTTPS based web services specification that provides hierarchical access, for example, an arborescence tree structure based access, to metadata about one or more WAMI Collections. An example of such a web services specification is WAMI Collection Service Specification as published by PIXIA Corp on their web site www.pixia.com. |
| A | WAMI Alert Service (WAMI:A): A web service that implements an HTTP or HTTPS based web services specification that alerts a subscriber with information on the latest updates to a CS or FCS. The web service may be "push" or "pull" based. An example of such a "pull" based WAMI:A web services specification is OGC® GeoRSS published on the website www.opengeospatial.org. |
| S | WAMI Search Service (WAMI:S): A web service that implements an HTTP or HTTPS based web services specification that provide a client program with the ability to search through WAMI collection metadata based on various elements of the metadata. Any traditional noSQL, SQL, or query based web services specification, for example AWS DynamoDB, can serve as a WAMI Search Services specification. |
| $D_K$ | WAMI Discovery Service using KML (WAMI:$D_K$): An embodiment of the present invention, WAMI Discovery Service using KML is a web service that provides a KML or KMZ file for each instance of WAMI:CS or WAMI:FCS. An example of the KML specification is OGC KML published on the website www.opengeospatial.org. |
| HS | HiPER STARE® (HS): HiPER STARE® is a registered brand name of a product used for the storage and dissemination of WAMI data. The product is manufactured and sold by PIXIA Corp. The product also implements all WAMI web services. HS implements all web services specified in this document and additional software features. Information about the product is published by PIXIA Corp on their web site www.pixia.com. |
| CS | CS location (WAMI:CS location): An installation of physical or virtual computer, storage, and network systems, server program runs that implement CS, IS, VS, A, S, $D_K$ and such web services. |
| FCS | FCS location (WAMI:FCS location): An installation of physical or virtual computer, storage, and network systems, this is running server program that implement FCS, S, $D_K$ and such web services. |

FIG. 21

METHOD AND SYSTEM FOR PROVIDING A FEDERATED WIDE AREA MOTION IMAGERY COLLECTION SERVICE

CROSS-REFERENCE TO RELATED APPLICATIONS

The present patent application is a continuation of U.S. patent application Ser. No. 16/526,480, filed Jul. 30, 2019, which is a continuation application of U.S. patent application Ser. No. 16/175,228, filed on Oct. 30, 2018, which is a continuation of U.S. patent application Ser. No. 15/850,069, filed on Dec. 21, 2017, which is a continuation of U.S. patent application Ser. No. 15/612,731, filed on Jun. 2, 2017, which is a continuation of U.S. patent application Ser. No. 13/784,726, filed on Mar. 4, 2013, which claims the benefit of priority to U.S. Provisional Application No. 61/735,538, filed on Dec. 10, 2012, the entire contents of which are incorporated herein by reference.

BACKGROUND OF THE INVENTION

Field of the Invention

The present invention pertains to global federation of Wide Area Motion Imagery (WAMI) web services.

Discussion of Related Art

A client program can access an HTTP or HTTPS URL, and if permitted, can gain access to data residing on computers located at more than one geographically separate location.

WAMI is a Large Volume Streaming Data, or Wide Area Surveillance Imagery, or Wide Area Airborne Surveillance, or Wide Area Persistent Surveillance Imagery. In general, a WAMI image frame includes one or more images captured using one or more sensors in a spectrum, for example the electromagnetic spectrum, or a projection of a spectrum (e.g., colorized representations of elevation, sonar, and seismic data) at substantially the same instant in time such that the effective logical image derived from, for example multiple images, covers a large geographic area (e.g., 15 kilometers by 15 kilometers), at a relatively high geospatial resolution (e.g., 0.5 meters). A WAMI data capture system may acquire a WAMI image several times per second, at a reasonably constant frequency (e.g., 2 WAMI frames per second). WAMI data is collected for a prolonged period in time, for example for 5 hours, 24 hours, or more. WAMI data collected over a single geographic region or over an extended swath of a geographic region. The WAMI data is either stored in camera space without changing pixels in the captured data, as one or more images per WAMI image frame, or in geographically corrected space, for example ortho-rectified, as a one image per WAMI image frame. A WAMI image frame is stored on a computer storage device such as a clustered storage solution, an object storage device, or a computer hard disk. Hence, WAMI data refers to a plurality WAMI image frames. A single WAMI collection refers to a set of spatiotemporally related WAMI image frames. For example, a WAMI collection is a set of temporally sequential WAMI frames over substantially the same geographic region. A WAMI collection may also include one or more WAMI collections. A location of WAMI data is a physical geographic location where one or more storage solutions, networking and computer equipment is utilized to store WAMI data and disseminate WAMI data. For example, U.S. Pat. No. 8,290,346 to Ernst et al. discusses a form of WAMI imagery, referring to WAMI imagery in the U.S. Pat. No. 8,290,346 patent as Large Format Video.

Basic interchange of computer data between a client program and a server program is a well-known technology. A client program communicates with a server program using a communication protocol over a network, for example a Local Area Network (LAN), Wide Area Network (WAN) or the Internet. Examples of a communication protocol are TCP, UDP, HTTP, HTTPS, or socket-based communication. A client program sends a request for data to a server program. Based on that request, a server sends data to the client that is a response to the request. One or more server programs running on a network, for example LAN or the Internet or the WWW, is also referred to as a Web Service.

The client program and the server program may be running on the same computer or on separate computers. In addition, a client program may be running on one or more computers. Furthermore, a server program may also be running on one or more computers. The computers running a client program and a server program communicate with each other via the network. For example, the computers can be connected to each other in some form over the network.

Server and client programs follow some type of communication protocol to be able to understand each other. For example, a client may ask a server about its capabilities. The server may respond, for example, with a list of services the server offers. The client can utilize the services to fulfill its goals by making additional requests to the server. A client program may include a set of one or more computer programs. A server program may also include a set of one or more computer programs.

The HTTP protocol is popular and a well-known standard over a computer network, for example, LAN, WAN and the internet or the World Wide Web (WWW). One current HTTP protocol version is HTTP 1.1 and is described in the Internet Engineering Task Force (IETF) RFC 2616. The HTTP 1.0 standard is another version of the HTTP protocol.

WAMI web services pertain specifically to HTTP or HTTPS based WAMI web services. A server that implements a WAMI web service provides at least a portion of WAMI data to an interested and permitted consumer client program. There are several types of WAMI web services that deliver at least a portion of WAMI data to a client program. The web services are generally categorized into the following:

a. WAMI COLLECTION SERVICE: A WAMI Collection Service, also referred in this document as a WAMI:CS or CS, provides information about one or more WAMI collections at a specific location. A WAMI:CS is based on HTTP or HTTPS protocol. For example, OGC® Web Mapping Service, Web Feature Service, and Web Coverage Service are a set of well-known web services protocols for dissemination of geospatial imagery. For example, web services specifications for a WAMI:CS are published by the Open Geospatial Consortium (OGC®) on their website at www.opengeospatial.org/standards/bp as document number OGC 12-032r2.

b. WAMI ALERT SERVICE: A WAMI Alert Service, also referred in the OGC 12-032r2 document as a WAMI:A or A, provides information about updates to one or more WAMI collections by a WAMI:CS at a specific location. A WAMI:A is based on HTTP or HTTPS protocol. For example, a WAMI:A runs at the same location as a WAMI:CS. Information about a specific WAMI:A web service is published, for example, by the OGC under the GeoRSS specification.

c. WAMI IMAGE SERVICE: A WAMI Image Service, also referred in the OGC 12-032r2 document as a WAMI:IS or IS, delivers an image in a known format from a client program defined area of interest (AOI) from a WAMI Image from a WAMI Collection. An AOI may also be referred to as a region of interest (ROI). A WAMI:IS may also further expand such a service to deliver one or more AOIs in a single web service request. A WAMI:IS may also further expand such a service to deliver metadata about one or more WAMI frames. A WAMI:IS is based on HTTP or HTTPS protocol. For example, as part of metadata for a WAMI collection within a WAMI:CS, an HTTP or HTTPS link to a WAMI:IS is also provided. For example, web services specifications for a WAMI:IS are published by the OGC as document number OGC 12-032r2.

d. WAMI VIDEO SERVICE: A WAMI Video Service, also referred in the OGC 12-032r2 document as a WAMI:VS or VS, provides a client program defined area of interests (AOI) from one or more WAMI Images from a WAMI Collection, as a video in a known format. An AOI may also be referred to as a region of interest (ROI). A WAMI:VS may also further expand such a service to deliver metadata about one or more WAMI frames. A WAMI:VS is based on HTTP or HTTPS protocol. For example, as part of metadata for a WAMI collection within a WAMI:CS, an HTTP or HTTPS link to a WAMI:VS is also provided. For example, web services specifications for a WAMI:VS are published by the OGC as document number OGC 12-032r2.

e. WAMI DISCOVERY SERVICE: A WAMI Discovery Service, also referred in the OGC 12-032r2 document as WAMI:D or D, provides a client program an XML, KML, or JSON, or a web resource in a known format with metadata comprising of an inverted arborescence tree-like structure permitting a client program to visualize the data geographically and enable a client program to build the ability to allow a user or computer program to mine through the data in order to search for a specific element or elements of information. If a WAMI:D is serving WAMI Metadata in KML or KMZ format, it is represented as WAMI:$D_K$ or $D_K$. For example, the OGC publishes a KML Specification on their website.

There are several other WAMI web services that co-exist with specified WAMI web services. For example, WAMI Raw Data Service or WAMI:RS or RS can provision raw WAMI camera space data to an interested and permitted client program. WAMI Search Service or WAMI:S or S would provide a general search interface on top of all WAMI and non-WAMI metadata.

BRIEF SUMMARY OF THE INVENTION

An aspect of the present invention is to provide a method for WAMI discovery, the method being implemented by a computer system that includes one or more processors configured to: issue a first request to a WAMI federated collection service (FCS) to retrieve WAMI collection metadata, said WAMI FCS being in communication with one or more WAMI collection services (CSs), each of the one or more WAMI CSs being in communication with a location where WAMI data is stored, the WAMI collection metadata comprising WAMI collection metadata that corresponds to each of the one or more WAMI CSs and that provides the location where the corresponding WAMI data is stored; receive a response from the WAMI FCS, the response comprising the WAMI collection metadata, the response being in a first format; translate the WAMI collection metadata from the first format into another format, wherein the translating includes a one-to-one mapping of WAMI federated collection nodes in the first format to WAMI federated collection nodes in the other format; issue a second request to the WAMI FCS to access WAMI data in the other format, one or more of the WAMI federated collection nodes in the other format being associated with a network link to one or more files in the other format that comprise the WAMI data in the other format; and retrieve in response to the second request, the WAMI data in the other format from the location that corresponds to the network link.

Another aspect of the present invention is to provide a system for WAMI discovery, the system comprising one or more processors configured to execute computer program instructions. The one or more processors may be configured to: issue a first request to a WAMI federated collection service (FCS) to retrieve WAMI collection metadata, said WAMI FCS being in communication with one or more WAMI collection services (CSs), each of the one or more WAMI CSs being in communication with a location where WAMI data is stored, the WAMI collection metadata comprising WAMI collection metadata that corresponds to each of the one or more WAMI CSs and that provides the location where the corresponding WAMI data is stored; receive a response from the WAMI FCS, the response comprising the WAMI collection metadata, the response being in a first format; translate the WAMI collection metadata from the first format into another format, wherein the translating includes a one-to-one mapping of WAMI federated collection nodes in the first format to WAMI federated collection nodes in the other format; issue a second request to the WAMI FCS to access WAMI data in the other format, one or more of the WAMI federated collection nodes in the other format being associated with a network link to one or more files in the other format that comprise the WAMI data in the other format; and retrieve in response to the second request, the WAMI data in the other format from the location that corresponds to the network link.

Although the various steps of the method are described in the above paragraphs as occurring in a certain order, the present application is not bound by the order in which the various steps occur. In fact, in alternative embodiments, the various steps can be executed in an order different from the order described above or otherwise herein.

These and other objects, features, and characteristics of the present invention, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. In one embodiment of the invention, the structural components illustrated herein are drawn to scale. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

BRIEF DESCRIPTION OF THE DRAWINGS

In the accompanying drawings:

FIG. 1 depicts a conventional configuration where a client program makes a request to a server program, and the server program responds to the client program with a response to that request over a computer network using the HTTP 1.1 specification;

FIG. 2 depicts a conventional client-server application workflow;

FIG. 17 is a diagram in which a WAMI:CS Collection Tree is served by a WAMI:CS implementation, the WAMI:CS Collection Tree holding all the metadata about each WAMI Collection being served by the WAMI:CS, information about available web services for each node of metadata in the tree, as well as information on the organization of all the nodes of the tree;

FIG. 21 depicts, in tabular form, a legend of the terminology and explains the symbols used in FIGS. 3-11.

DETAILED DESCRIPTION OF EMBODIMENTS OF THE INVENTION

Figure 3:
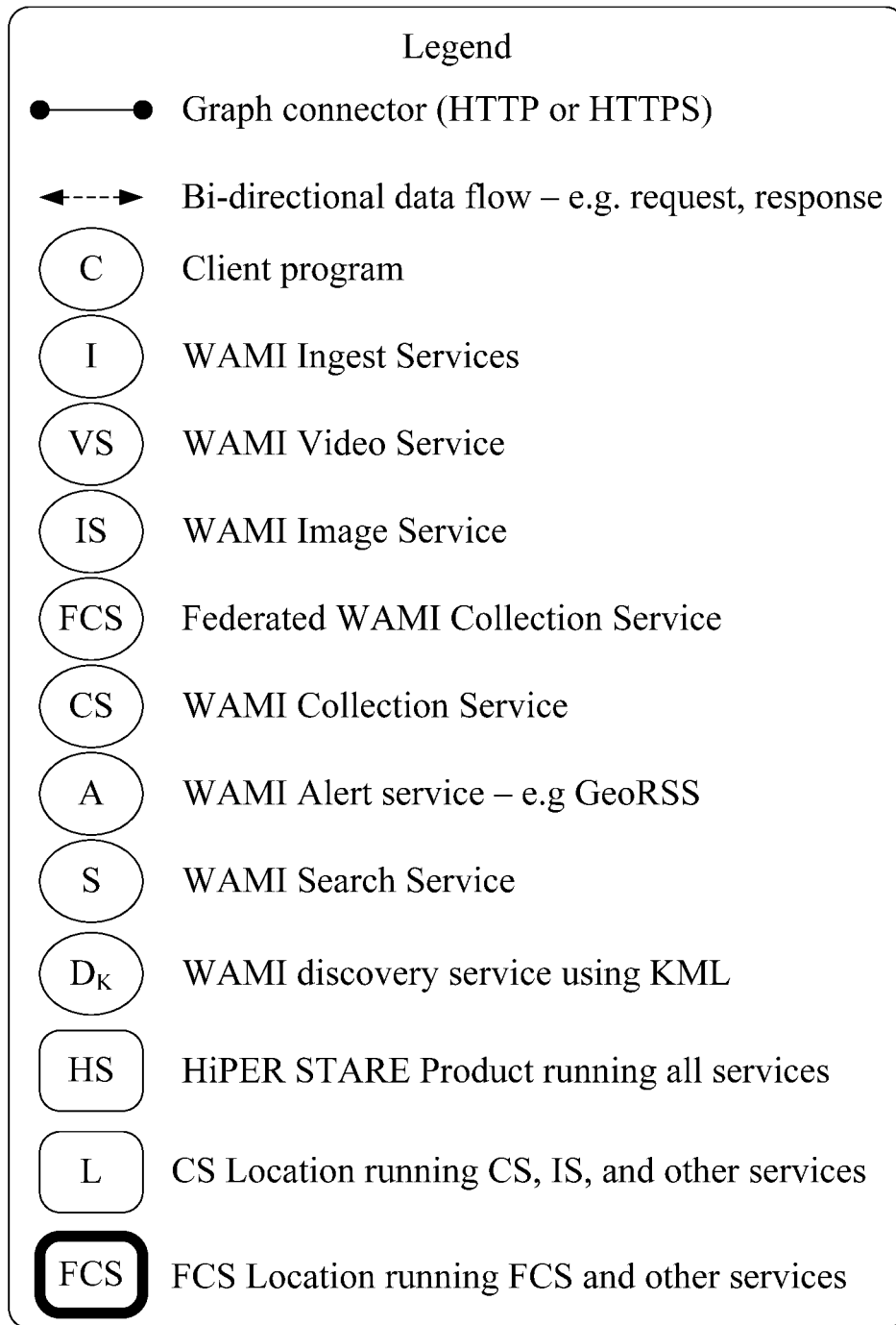
FIG. 3 is a table providing a legend used in various subsequent figures explaining the purpose of each component in the Figures.

FIG. 1 depicts a conventional configuration in which a client program makes an HTTP 1.1 request to a server program and the server responds with a HTTP 1.1 response comprising in-part of the data requested by the client program. A client program is also a computer program that requests a server program to store data. In that case, a server program is a computer program that fulfills the request to store data from a client program and sends an appropriate response. A client program is also a computer program that requests for data and consumes it for a purpose. In that case, a server program is a computer program that provisions that data to a client program.

FIG. 2 depicts a conventional client-server application workflow. As shown in FIG. 2, a client program generates a request for a server program and sends the request to the server program over a computer network. The server program receives the request, processes it and generates a response. The response is sent by the server program back to the client program over a computer network. The client program receives the response. The cycle may then be repeated.

FIG. 21 depicts a legend of the terminology and explains the symbols used in FIGS. 3-11.

In the following paragraphs, a method for the global federation of WAMI Collection Services and a method for the global federation of WAMI Discovery Services are described.

While various web services bear specific names, and various web services specifications have a specific syntax, and various schemas have specific tag names, these may vary based on the standard or well-defined grammar being implemented for the client and/or the server.

While Federated Web Services are generally prevalent in the industry, Federating WAMI requires a specialized set of methods that are substantially different from traditional methods of federating. In conventional methods, data being served is cached based on algorithms, for example, data is brought to data centers that are closer to the consuming client program or the client program runs in the location closest to the data. WAMI data is large in terms of quantity (in terms of bytes). Movement of such data over the Internet or WWW is cost prohibitive, inefficient and in most cases impractical on present networks as well as anticipated networks of the near future. Therefore, only data that is absolutely needed is transmitted to the interested client program. WAMI data is kept at the location of its acquisition. Data exploitation client programs and web services query this data and get only what they need. It can be argued that these client programs and web services can move themselves to be near the data, running on computers that are on fast networks, within the same infrastructure as the WAMI Data. Such exploitation client programs or web services implement complex methods to process WAMI Data. Such methods require additional compute infrastructure, which can also become cost prohibitive.

WAMI data is collected from locations geographically difficult to access, often times requiring build-up of power, networking and other fundamental facilities. Since WAMI data is used for the military, defense, surveillance and reconnaissance; locations collecting data may also be hostile. WAMI data collection locations can be physically disparate but an application consuming WAMI data may find the need to access a lot of the data at disparate locations in order to build a cohesive picture of the intelligence gathered from the data. Data is time critical, requiring immediate or near immediate access by consuming applications, with the ability to look into past WAMI data for correlation. Building a complex compute and storage infrastructure to move client programs to the data or to move data to the client programs becomes cost prohibitive.

A system of light-weight web services that do not require as much compute power can be run on reasonably inexpensive compute infrastructure, focusing a bulk of the cost on providing mobile networked storage capability at each location. Client programs demanding high performance computing capabilities are moved to compute clusters in data centers that have the capacity to handle high compute loads. Client programs access WAMI data at disparate locations using light-weight web services.

An interested Client Program is a client program that wishes to consume WAMI data for a specific purpose. Despite the physical disparity in locations, the client program should be able to access only one Internet or WWW location, and be able to traverse through a certain well-defined hierarchy; and be able to get the data from their location of choice; and be able to receive parts of the data for focused processing.

For example, in today's familiar mapping applications, generally a client program such as an internet web browser goes to one familiar and published web site. From that point, the client program does not care which specific computer or internet address the map data actually come from. In actuality, the maps may be coming from completely different data centers and disparate computers running in these data centers.

Therefore, the act of presenting a single entry point to a client program for access to disparate locations of WAMI data and metadata is the Federation of Wide Area Motion Imagery web services.

Figure 4:
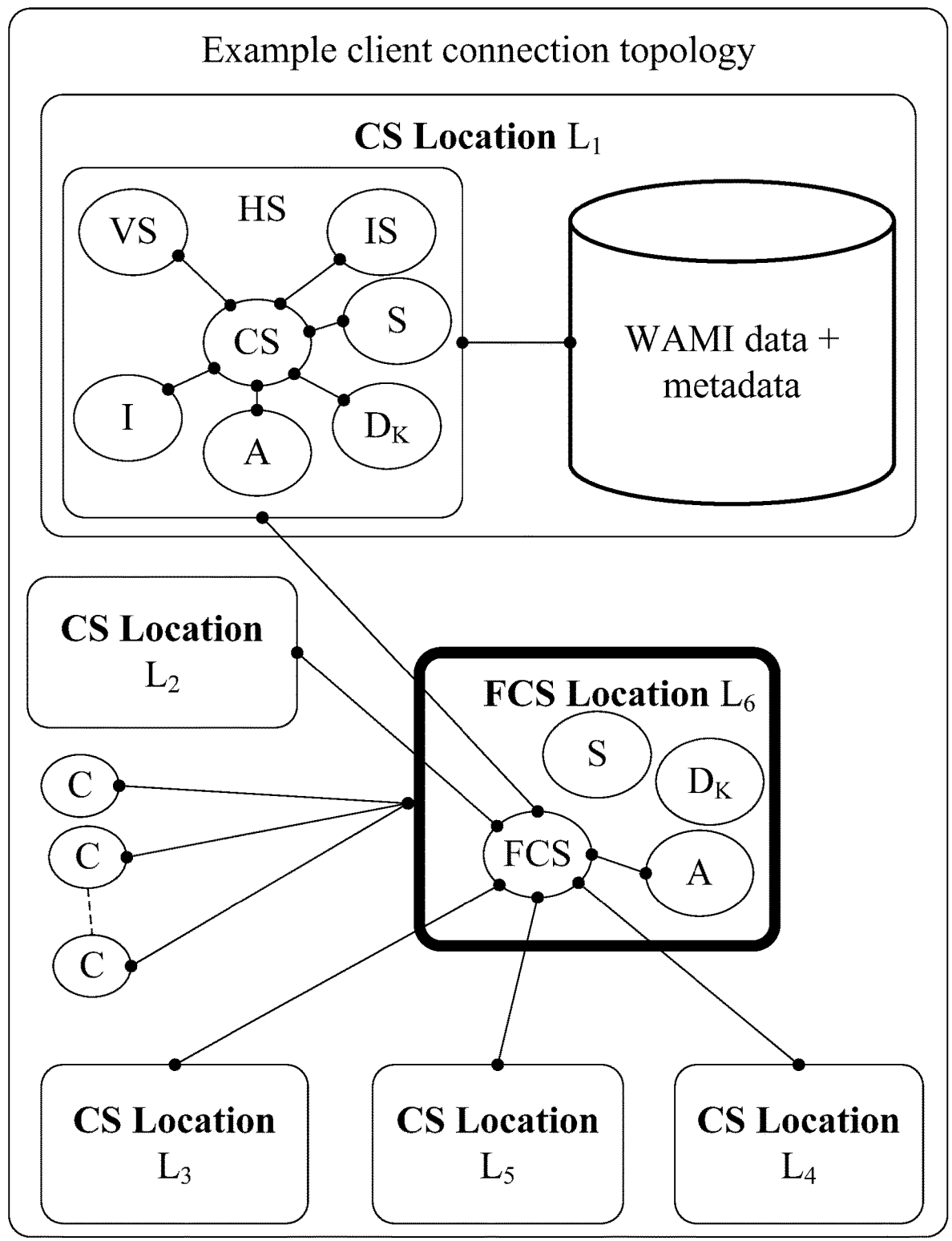
FIG. 4 depicts a configuration in which one or more client programs access WAMI data at one or more WAMI:CS locations through a single WAMI Federated Collection Service location, where each WAMI:CS location has provisioned one or more WAMI web services, for example, WAMI:CS, WAMI:IS, WAMI:VS, and WAMI:$D_K$; and where each WAMI:FCS location has provisioned at least a WAMI:FCS and zero or more WAMI web services, for example, WAMI:$D_K$, according to an embodiment of the present invention.

FIG. 4 depicts a configuration in which one or more client programs access WAMI data at one or more WAMI:CS locations through a single WAMI Federated Collection Service location, where each WAMI:CS location has provisioned one or more WAMI web services, for example, WAMI:CS, WAMI:IS, WAMI:VS, and WAMI:$D_K$; and where each WAMI:FCS location has provisioned at least a WAMI:FCS and, optionally, one or more WAMI web services, for example, WAMI:$D_K$, according to an embodiment of the present invention. FIG. 4 depicts an example of a connection topology that shows interaction amongst various WAMI web services at various locations. Locations $L_1$, $L_2$, $L_3$, $L_4$ and $L_5$ ($L_1$ to $L_5$) depict locations running the same type of software, each serving different WAMI Collections of WAMI data and metadata. Each location $L_1$ to $L_5$ has installations of HiPER STARE® (HS) from PIXIA. Each installation of HS is at least providing implementations of a WAMI collection service (CS) and WAMI image service (IS). Each installation of HS may also be providing implementations of WAMI video service (VS), WAMI alert service (A), WAMI discovery service ($D_K$), WAMI search service (S), WAMI ingest service (I), and any additional web services. Location $L_6$ is a Federated WAMI collection service (FCS) location. $L_6$ has at least implementations of FCS. Each installation of HS may also be providing implementations of A, $D_K$, S, and any additional web services. $D_K$ at an FCS location requires $D_K$ at any CS locations or FCS locations that it is connected to. A client program C accesses all WAMI data at all locations $L_1$ to $L_5$ via $L_6$. This makes $L_6$ a location for WAMI Federated Collection Service and a WAMI Discovery Service that is also federated across the WAMI data and metadata enterprise. Therefore, FIG. 4 represents an embodiment of Federating WAMI Web Services.

Figure 5:
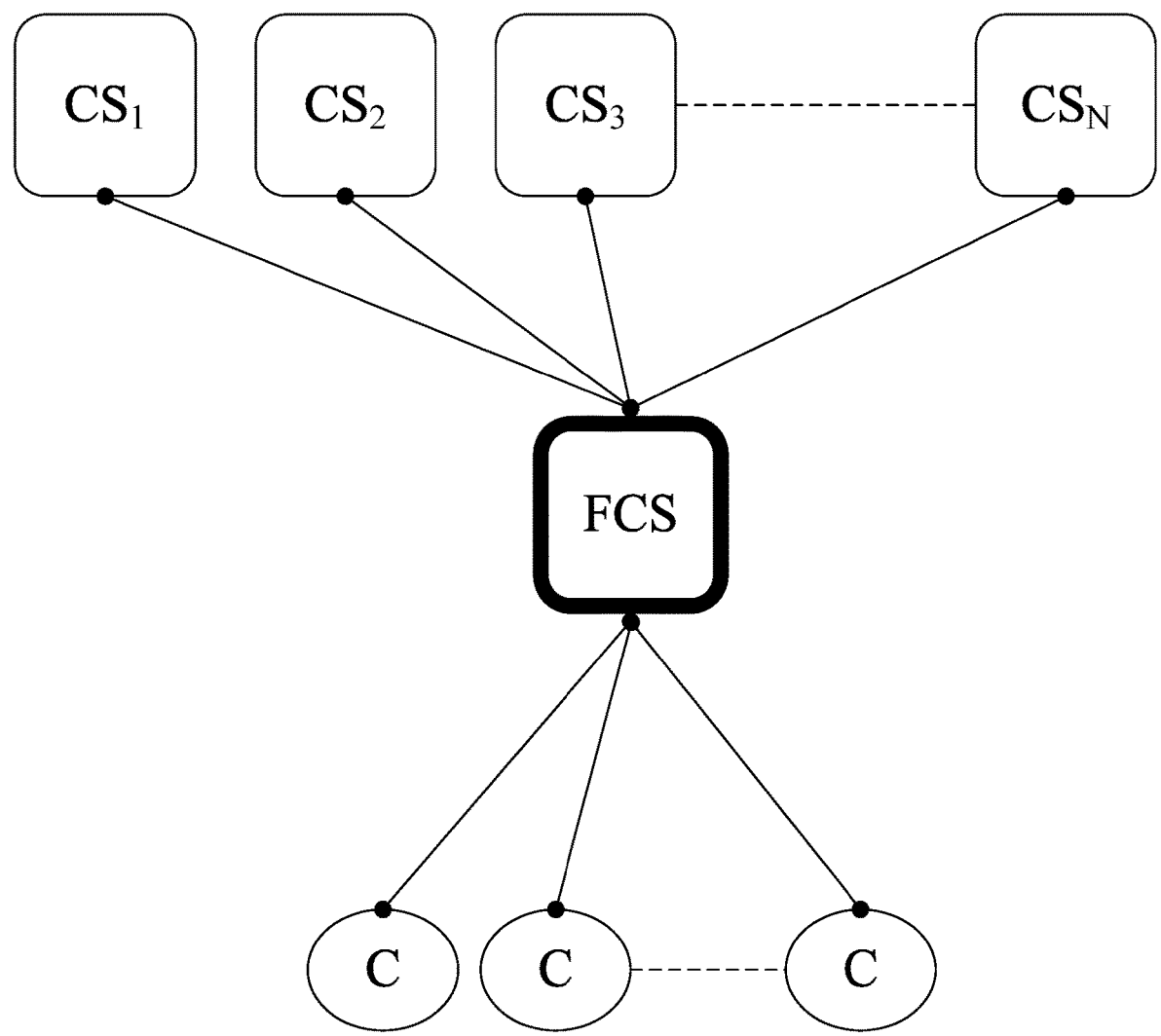
FIG. 5 depicts a configuration in which one or more client programs access WAMI data at one or more WAMI:CS locations through a single WAMI Federated Collection Service location, according to an embodiment of the present invention.

FIG. 5 depicts a configuration in which one or more client programs access WAMI data at one or more WAMI:CS locations through a single WAMI Federated Collection Service location, according to an embodiment of the present invention. As shown in FIG. 5, FCS location can be directly connected to one or more CS locations. The location of a CS and an FCS can be on the same compute node, or in the same compute cluster. Since the interchange is via HTTP or HTTPS, it really does not matter whether an FCS location overlaps with a CS location or the FCS location is physically separate from a CS location. One or more client programs C can access all data at any CS location using the WAMI Collection Service implementation at the FCS location. A WAMI:CS serves metadata about one or more WAMI collections.

WAMI collection metadata is organized in the form of an arborescence tree structure, also known as a directed acyclic graph (DAG). Since the metadata is organized as a tree structure, the root node of a specific WAMI:CS can become an edge node in another WAMI:FCS. A WAMI:FCS maintains a list of WAMI:CS that it manages. Therefore, when a client program C, wishes to get information about a specific WAMI:CS at a specific location, all it needs to do is use the WAMI collection service web services Specification to access that specific WAMI:CS via the WAMI:FCS as if that WAMI:CS were a node in the tree being served by a WAMI:CS.

Figure 6:
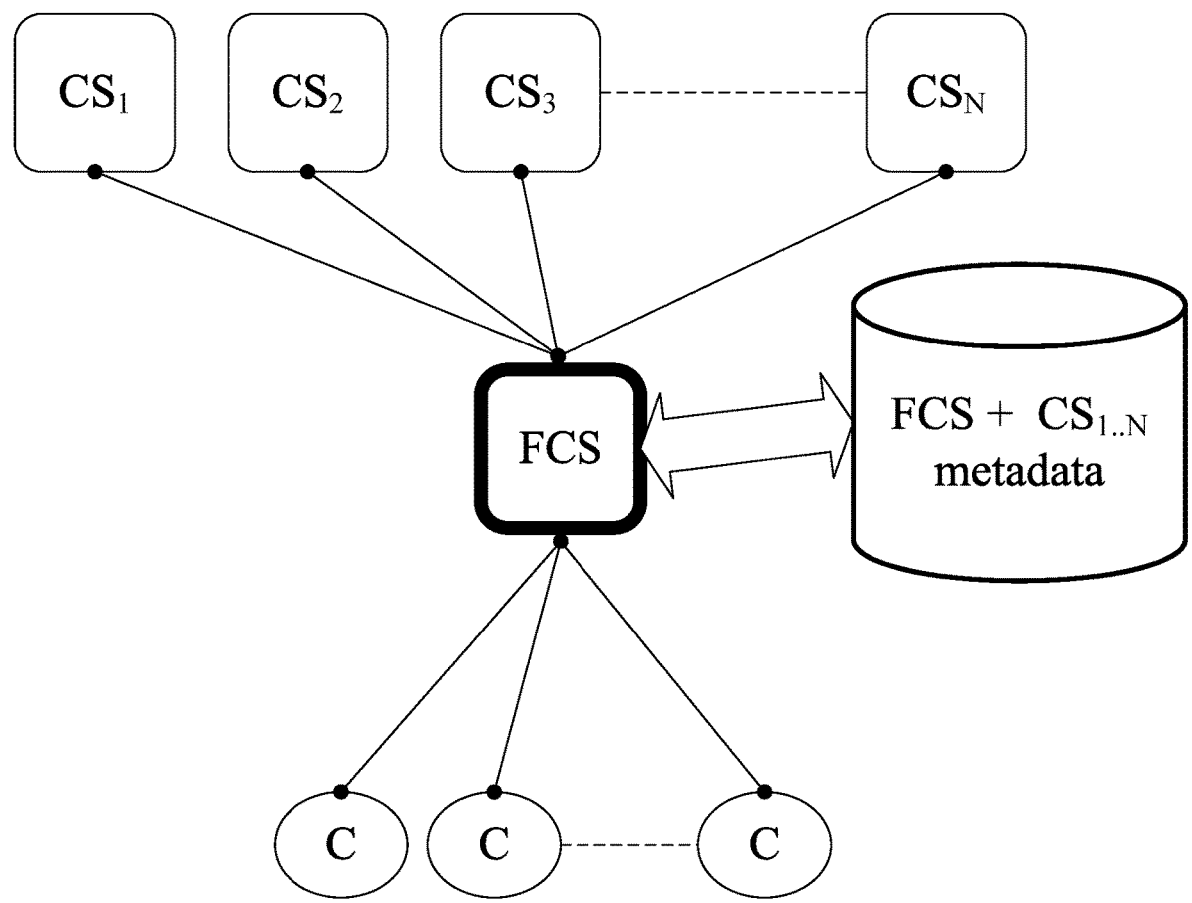
FIG. 6 depicts a configuration in which an FCS location instance runs a WAMI:FCS that aggregates WAMI collection metadata from one or more WAMI:CS running at one or more WAMI:CS locations, and generates WAMI:FCS metadata to assist in the execution of the WAMI:FCS, according to another embodiment of the present invention.

FIG. 6 depicts a configuration in which an FCS location instance runs a WAMI:FCS that aggregates WAMI collection metadata from one or more WAMI:CS running at one or more WAMI:CS locations, and generates WAMI:FCS metadata to assist in the execution of the WAMI:FCS, according to another embodiment of the present invention. The WAMI:FCS implementation maintains a synchronized instance of metadata from all WAMI:CS locations that are running a WAMI:CS at each WAMI:CS location.

Figure 7:
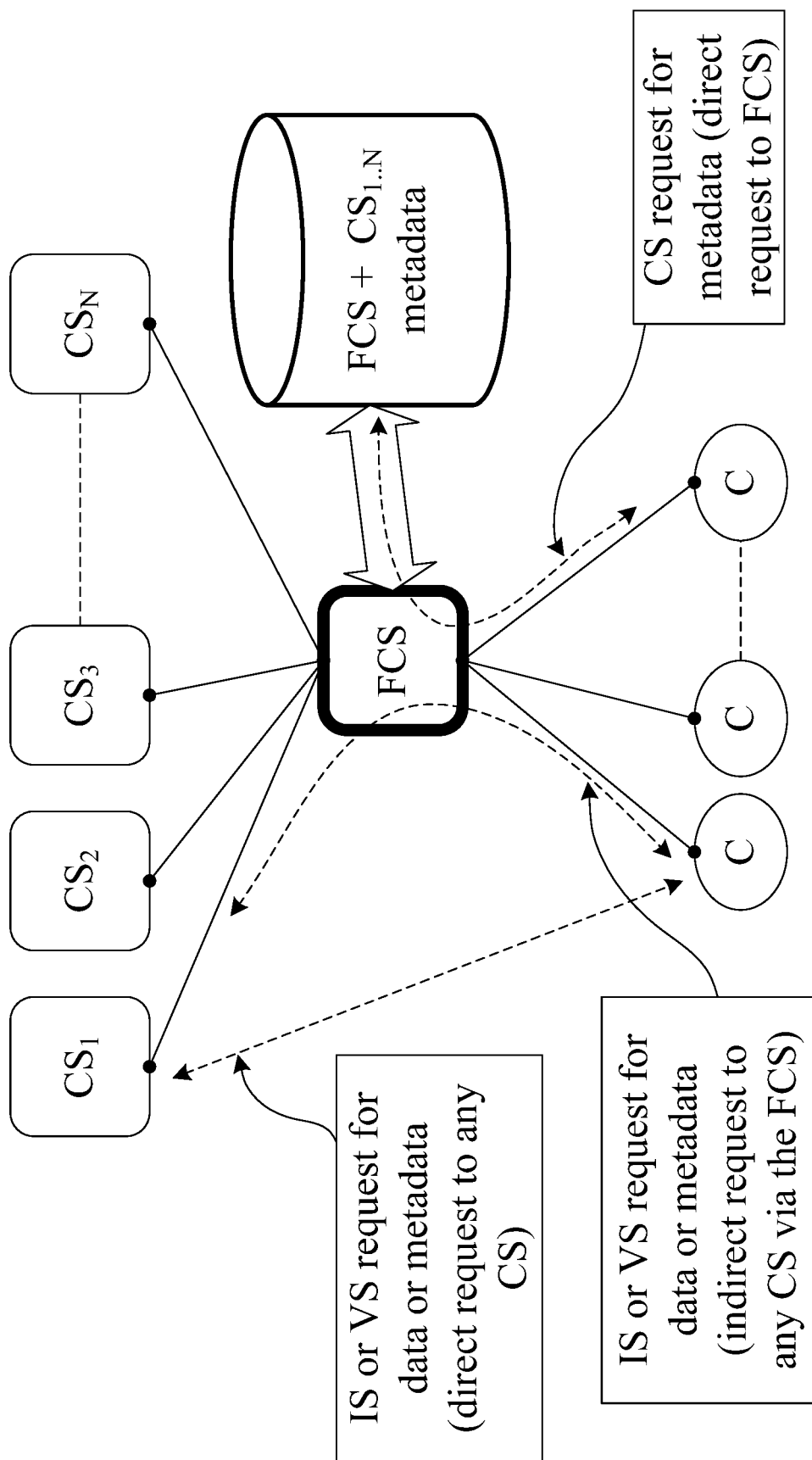
FIG. 7 depicts a configuration in which a client program makes a request for WAMI metadata in a well-known and published HTTP or HTTPS protocol to a WAMI:FCS location and gets a valid response from an instance of a WAMI:FCS web service, as well as a client program that makes a request for WAMI image or video data and metadata from a WAMI:IS, or WAMI:VS running at a WAMI:CS location using the metadata acquired from a prior request to a WAMI:FCS location, according to another embodiment of the present invention.

FIG. 7 depicts a configuration in which a client program makes a request for WAMI metadata in a well-known and published HTTP or HTTPS protocol to a WAMI:FCS location and gets a valid response from an instance of a WAMI:FCS web service, as well as a client program that makes a request for WAMI image or video data and metadata from a WAMI:IS, or WAMI:VS running at a WAMI:CS location using the metadata acquired from a prior request to a WAMI:FCS location, according to another embodiment of the present invention. As shown in FIG. 7, a client program makes a WAMI collection service web services request to an instance of an FCS running at a FCS location. This request accesses metadata that is localized by the FCS running at the FCS location. A client program can access all metadata about each collection tree being served by each WAMI:CS running at each WAMI:CS location. The client program can do so by navigating an aggregated tree derived from $CS_1$ location, $CS_2$ location, $CS_3$ location, . . . , up to $CS_N$ location. Once a client C has information about what the client wants to access, the client can issue a direct CS, IS, VS or other web services request to any one of the CS locations ($CS_1$, $CS_2$, $CS_3$, . . . , $CS_n$) depicted in FIG. 7. The client C can make this request directly to any one of the CS locations, or the client C can make this request indirectly to one of the CS locations, for example, via the FCS location.

Figure 8:
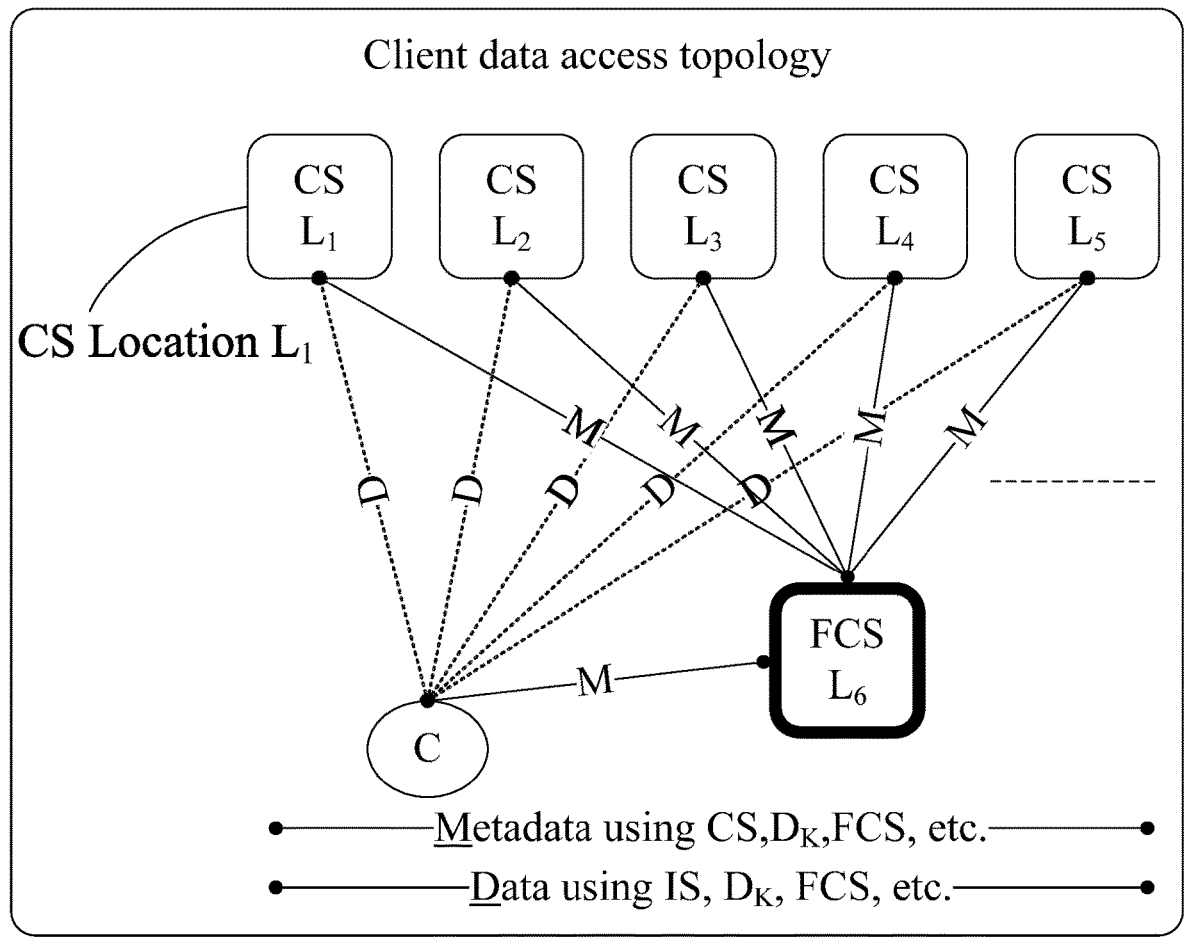
FIG. 8 is a diagram depicting an example of a network connection topology where a client program requests for metadata M from a WAMI:FCS location L6, where L6 has already aggregated metadata M from WAMI:CS locations L1 to L5; and where a client programs requests for image and video data D directly from WAMI:CS locations L1 to L5 using resident WAMI:VS and WAMI:IS web services, according to an embodiment of the present invention.

FIG. 8 is a diagram depicting an example of a network connection topology where a client program requests for metadata M from a WAMI:FCS location $L_6$, where $L_6$ has already aggregated metadata M from WAMI:CS locations $L_1$ to $L_5$; and where a client programs requests for image and video data D directly from WAMI:CS locations $L_1$ to $L_5$ using resident WAMI:VS and WAMI:IS web services, according to an embodiment of the present invention. As shown in FIG. 8, a client program C makes a request M for WAMI collection metadata to Federated Collection Service location (FCS location) $L_6$. Separately, and independently, the FCS location $L_6$ can make WAMI:CS requests M to CS locations $L_1$ to $L_5$ to localize all of the WAMI collection trees being served by WAMI:CS instances running at those CS locations $L_1$ to $L_5$. In another example, a Client C makes a WAMI: $D_K$ request to the FCS location $L_6$ to get connection points to all WAMI Collections at all CS locations $L_1$ to $L_5$. Although five locations $L_1$ through $L_5$ are described in this example, the client data access topology can be implemented with any number of locations (e.g., one, two or more locations).

As shown in FIG. 8, in order to access WAMI Data from WAMI collections, the client C makes direct requests D to any one or more of CS locations $L_1$ to $L_5$. For example, these direct requests can be for WAMI data as AOI image data to an instance of WAMI:IS running at CS locations $L_1$ to $L_5$. For example, these direct requests can be for WAMI data as AOI video data to an instance of WAMI:VS running at CS locations $L_1$ to $L_5$. For example, these direct requests can be for WAMI data and metadata to an instance of WAMI:$D_K$ running at CS locations $L_1$ to $L_5$.

The data being served by a WAMI:CS is a WAMI:CS collection tree. An example of a WAMI collection tree is depicted in FIG. 17. FIG. 17 is a diagram in which a WAMI:CS collection tree is served by a WAMI:CS implementation, the WAMI:CS collection tree holding all the metadata about each WAMI collection being served by the WAMI:CS, information about available web services for each node of metadata in the tree, as well as information on the organization of all the nodes of the tree. The WAMI collection tree follows the conventional layout of a directed acyclic graph, or arborescence tree. Such a tree comprises of nodes and edges. Edges connect nodes in a defined hierarchy. A node in such a tree has zero or one parent node and zero or more child nodes. A root node of the tree is the entry point for data being served by a WAMI:CS. It is the first node. It has no parent, and zero or more child nodes. Root node carries some metadata about it and its child nodes. An internal node of the tree is a node that has one parent and one or more child nodes. An internal node carries metadata regarding it and its child nodes. A leaf node of the tree is a node that has one parent and zero child nodes. A leaf node carries all metadata of a WAMI Collection. An internal node eventually leads to a leaf node.

Figure 18:
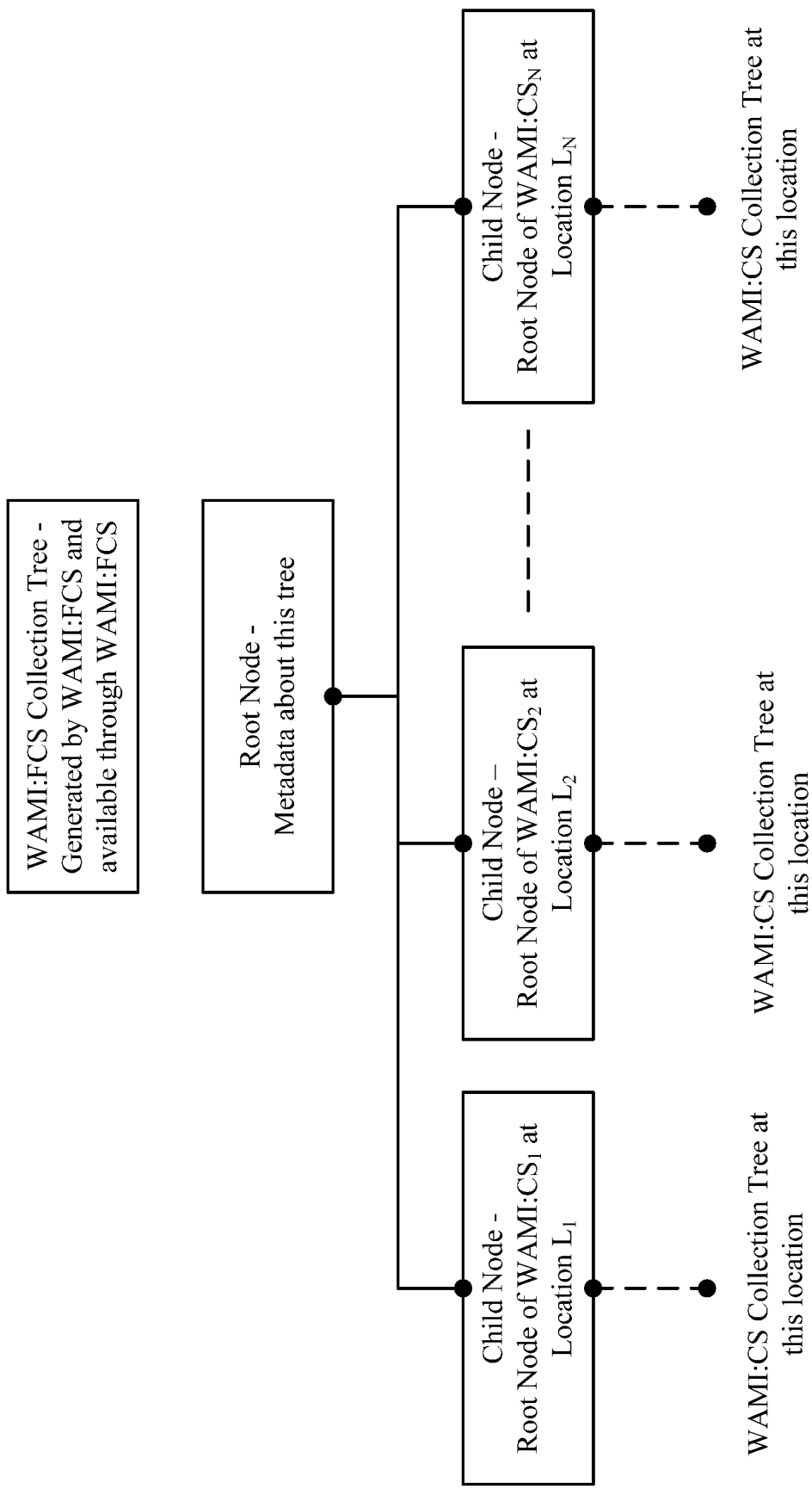
FIG. 18 depicts a WAMI:FCS Collection Tree being served by a WAMI:FCS implementation, the WAMI:FCS Collection Tree holding all the metadata about each WAMI:CS tree, and holding a link to each WAMI:CS location's WAMI:CS Collection Tree, according to an embodiment of the present invention.

FIG. 18 depicts a WAMI:FCS collection tree being served by a WAMI:FCS implementation. The WAMI:FCS collection tree is holding all the metadata about each WAMI:CS tree, and holding a link to each WAMI:CS location's WAMI:CS collection tree, according to an embodiment of the present invention. As shown in FIG. 18, when a WAMI:FCS generates metadata to enable a client program C to use the WAMI:FCS location running the WAMI:FCS to act as a Federated web service. The WAMI:FCS serves a WAMI collection tree that is generated by the WAMI:FCS by turning root nodes of all WAMI:CS instances running at various WAMI:CS locations under it into internal nodes of its own WAMI collection tree. The resulting WAMI collection tree is a federated WAMI collection tree. Its schema is the same as any WAMI collection tree being served by any WAMI:CS. Such a configuration provides an abstraction that is on top of and an aggregation of all WAMI:CS instances serving different WAMI:CS collection trees from different locations. For example, as shown in FIG. 18, the root node of $WAMI:CS_1$ is located at location $L_1$, the root node of $WAMI:CS_2$ is located at location $L_2$, . . . , the root node of $WAMI:CS_N$ is located at location $L_N$. The root node of $WAMI:CS_1$ is associated with the collection tree of location $L_1$. The root node of $WAMI:CS_2$ is associated with the collection tree of location $L_2$. The root node of $WAMI:CS_N$ is associated with the collection tree of location $L_N$. The root nodes of all WAMI:CS locations are linked to one root node, turning them into internal nodes within a federated WAMI collection tree. A web service serving this federated WAMI collection tree becomes a Federated WAMI Collection Service.

Figure 9:
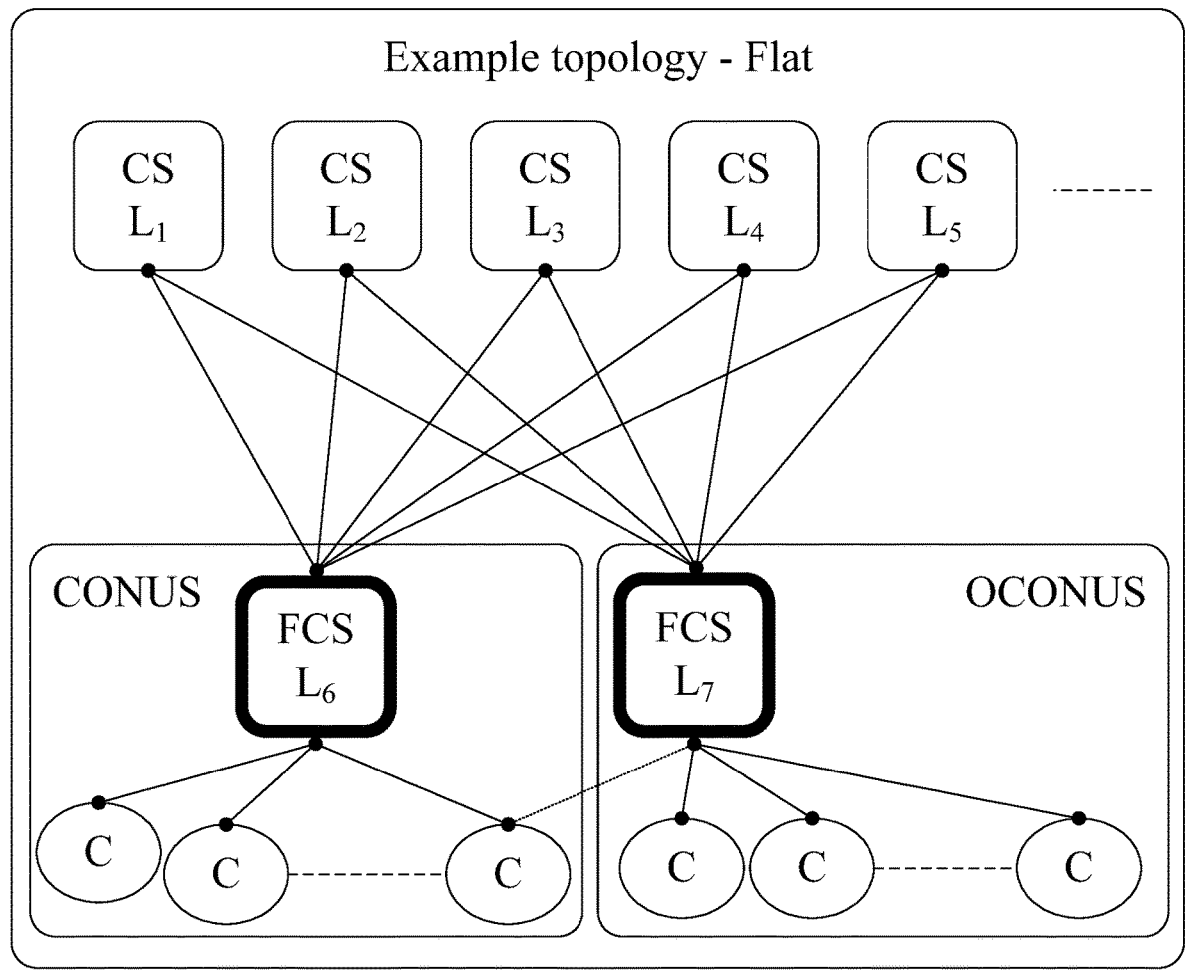
FIG. 9 is a diagram depicting an example network connection topology where a client program requests for WAMI Data and Metadata using a flat topology, where one or more FCS Locations in different geographic locations, for example Continental United States (CONUS) and Outside Continental United States (OCONUS), and each FCS Location can be utilized by client programs to get WAMI Data and Metadata, and each FCS Location has access to all CS Locations, according to an embodiment of the present invention.

FIG. 9 is a diagram depicting an example network connection topology where a client program requests for WAMI Data and Metadata using a flat configuration of WAMI:FCS locations to access Data and Metadata existing at one or more WAMI:CS locations, according to an embodiment of the present invention. In this connection topology, a set of one or more client programs C can connect to one or more FCS locations $L_6$ or $L_7$. For example, the FCS location $L_6$ is preferred by client programs in CONUS whereas the FCS Location $L_7$ is preferred by client programs in OCONUS. If for any reason, a client program C in CONUS loses connection with $L_6$, it can get access to all the data via $L_7$.

Figure 10:
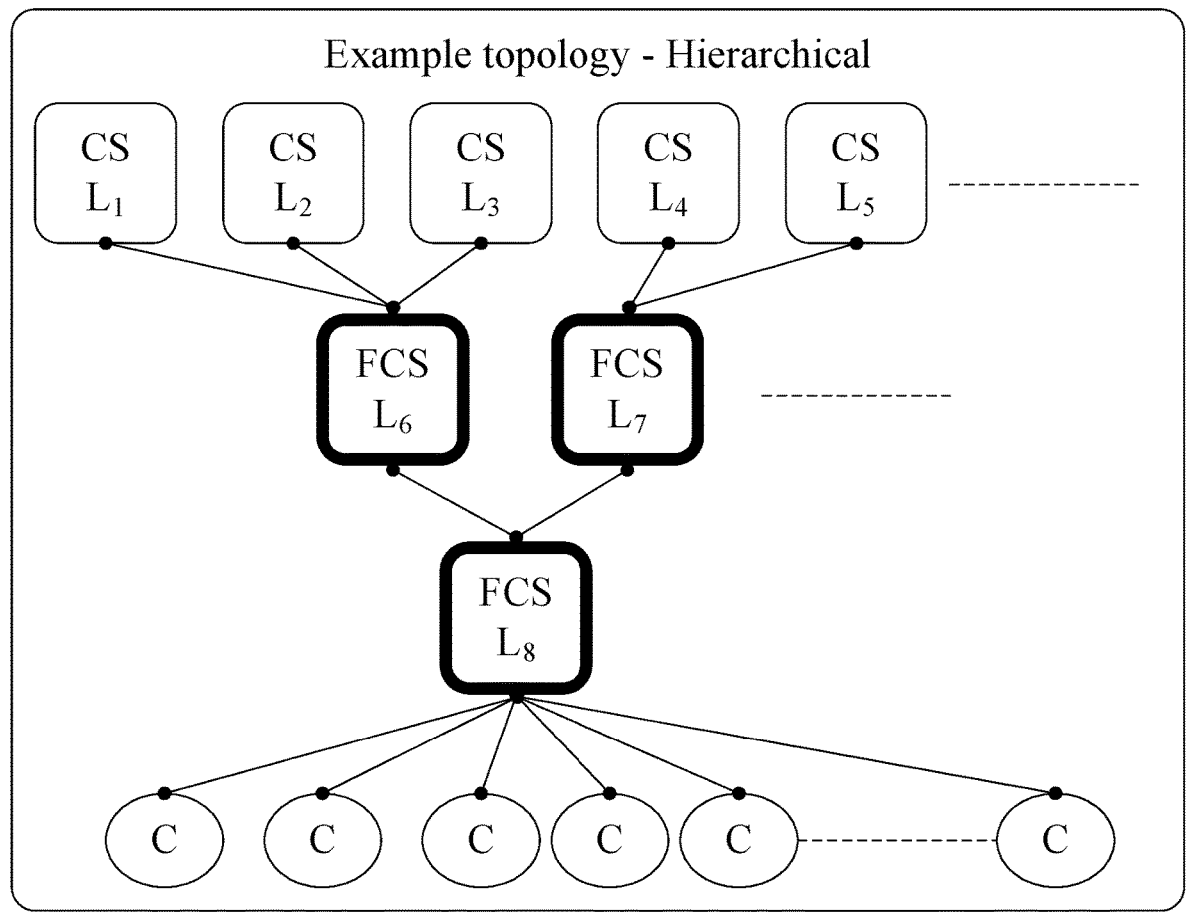
FIG. 10 is a diagram depicting an example network connection topology where a client program requests for WAMI Data and Metadata using a tree-based hierarchy of WAMI:FCS locations to access Data and Metadata existing at one or more WAMI:CS locations, according to an embodiment of the present invention.

FIG. 10 is a diagram depicting an example network connection topology where a client program requests for WAMI Data and Metadata using a tree-based hierarchy of WAMI:FCS locations to access Data and Metadata existing at one or more WAMI:CS locations, according to an embodiment of the present invention. In this connection topology, a set of one or more client programs C can connect to one FCS location $L_8$. The FCS location $L_8$ is in turn connected to two different FCS locations $L_6$ and $L_7$. FCS location $L_6$ is connected to CS locations $L_1$, $L_2$ and $L_3$. FCS location $L_7$ is connected to CS locations $L_4$ and $L_5$. In FIG. 10, FCS locations are shown as thick squares and CS locations are shown as thin squares. All clients C can access, using a single WAMI:FCS entry point, all WAMI:CS running at all WAMI:CS locations through a hierarchical connection topology. Therefore, using such a hierarchical topology, all clients C can access a Federation of WAMI Collections spread across several locations. Although three FCS locations $L_6$, $L_7$ and $L_8$ are shown in FIG. 10, any number (i.e., one or more) of FCS locations can be provided. Similarly, although five CS locations $L_1$ through $L_5$ are depicted in FIG. 9, any number of CS locations can be provided. In this example, FCS location $L_8$ is connected to two FCS locations $L_6$ and $L_7$. However, as it can be appreciated, the FCS location $L_8$ can be connected to more than two FCS locations, each of which can be connected to one or more CS locations.

Figure 11:
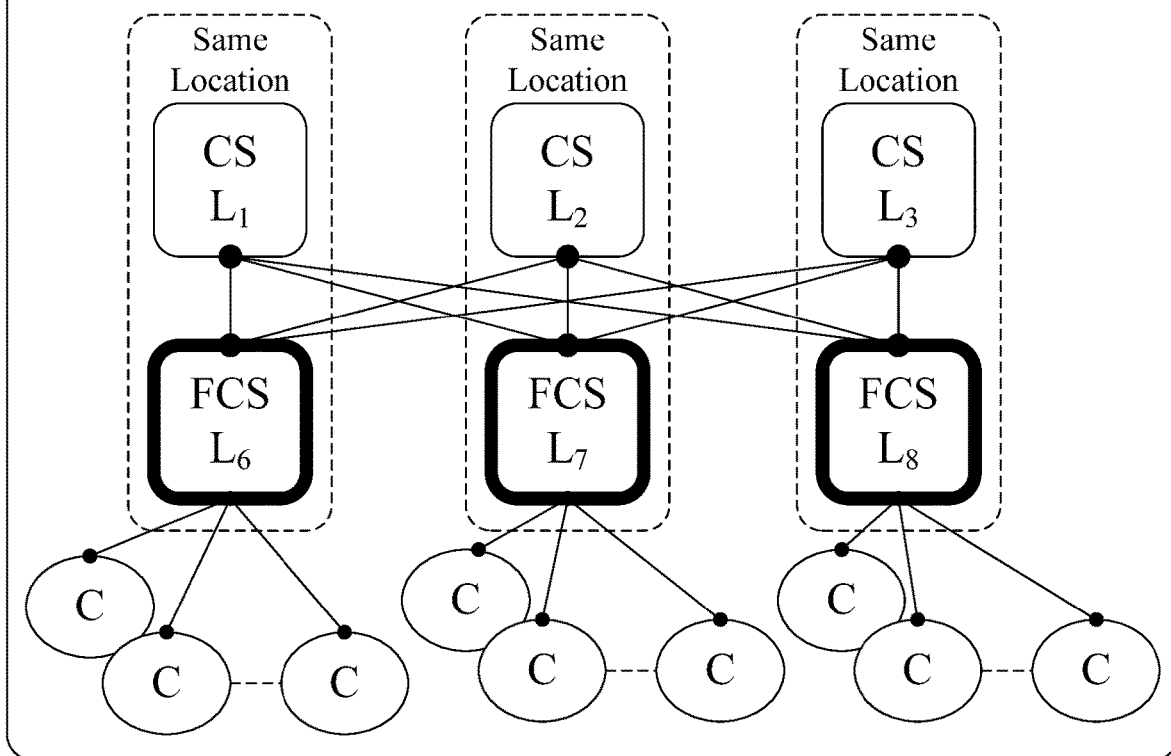
FIG. 11 is a diagram depicting an example network connection topology where a client program requests for WAMI data and metadata from the nearest WAMI:FCS location but is able to access WAMI data and metadata from one or more WAMI:CS locations, according to an embodiment of the present invention.

FIG. 11 is a diagram depicting an example network connection topology where a client program requests for WAMI data and metadata from the nearest WAMI:FCS location but is able to access WAMI data and metadata from one or more WAMI:CS locations, according to an embodiment of the present invention. In this connection topology, a location is both a CS location and an FCS location. In this topology, there are multiple FCS/CS locations. An FCS location at each such location is aware of all CS locations. In FIG. 11, FCS locations $L_6$, $L_7$ and $L_8$ are shown as thick squares and CS locations $L_1$, $L_2$, $L_3$ are shown as thin squares. A client program C that is at a WAMI FCS location $L_6$ is closest to WAMI CS location $L_1$. However, the client also has access to WAMI:CS locations $L_2$ and $L_3$. A client program C that is at a WAMI:FCS location $L_7$ is closest to WAMI CS location $L_2$. However it also has access to WAMI:CS locations $L_1$ and $L_3$. The same applies to a client program connected to WAMI:FCS location $L_8$. Similar to the topology shown in FIG. 10, any number of CS and/or FCS locations can be implemented. In addition, one or more FCS can be associated with one or more CS. Hence, although FIG. 11 shows one FCS being co-located (i.e., same location) with one CS, it is also contemplated that one FCS be co-located with two or more CS. Therefore, a hybrid topology between the topology shown in FIG. 10 and the topology shown in FIG. 11 is also contemplated.

Figure 12:
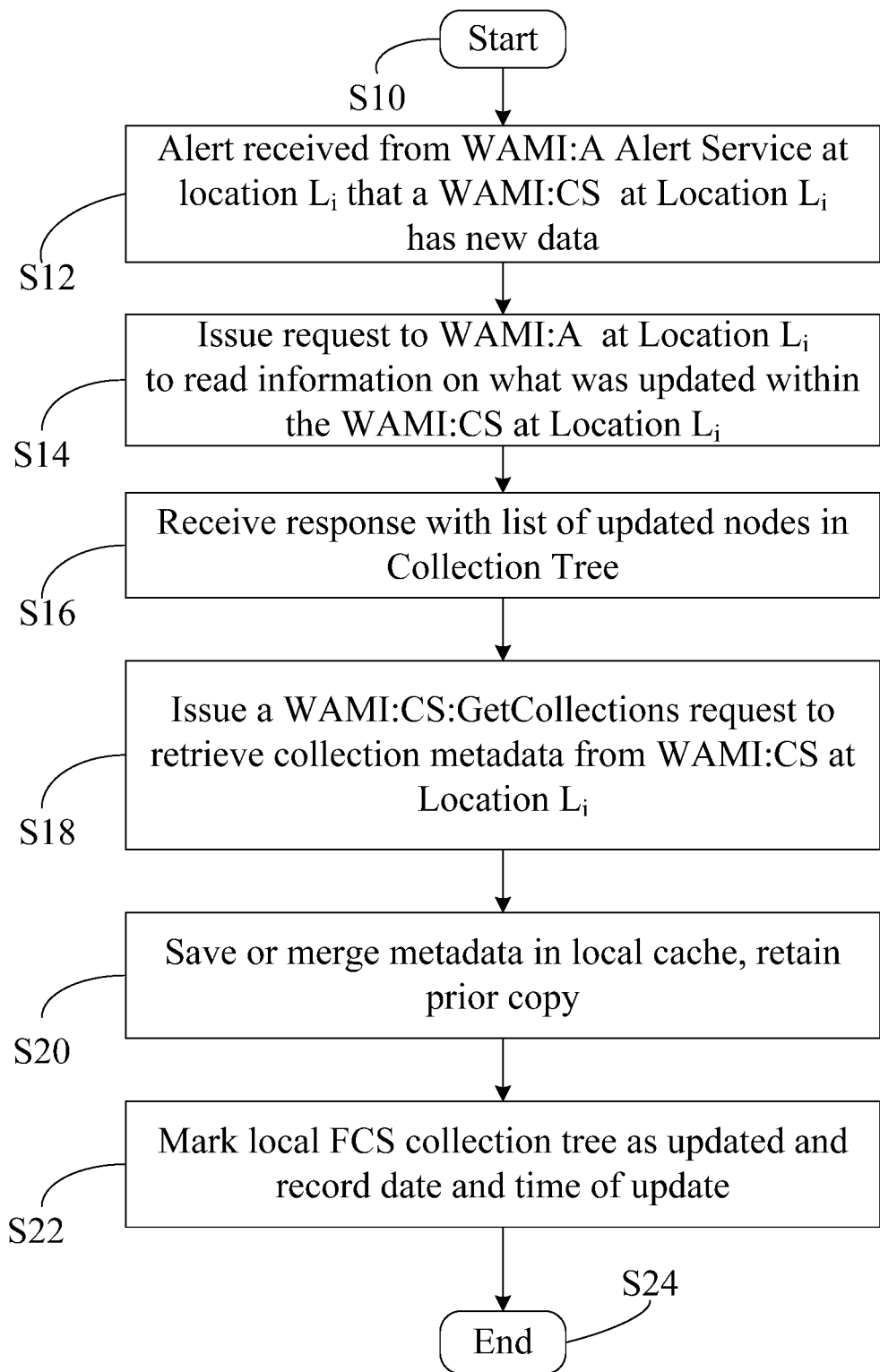
FIG. 12 is a flowchart of an implementation of a Federated WAMI Collection Service (WAMI:FCS) module that localizes WAMI collection metadata from a WAMI:CS Location based on an alert received from the same WAMI:CS Location, according to an embodiment of the present invention.

FIG. 12 is a flowchart of an implementation of a Federated WAMI Collection Service (WAMI:FCS) module running at a WAMI:FCS Location $L_j$ that localizes WAMI collection metadata from a WAMI Collection Service (WAMI:CS) running at a WAMI:CS Location $L_i$ upon receiving an alert from $L_i$ that the WAMI collection metadata has been updated at $L_i$. In one embodiment, it can be implicitly assumed that an alert service WAMI:A is running at a location $L_i$ and the WAMI:FCS has subscribed to alerts from this service. In the example topology depicted in FIG. 4, a WAMI:CS location $L_i$ would be any one of the locations $L_1$, $L_2$, $L_3$, $L_4$ and $L_5$. A WAMI:FCS location $L_j$ would be $L_6$. A WAMI Alert Service (WAMI:A) running at location $L_i$ monitors the WAMI:CS, also running at location $L_i$, and alerts any subscribing WAMI:FCS module at any location $L_j$ regarding any updates to data served by the WAMI:CS at location $L_i$, according to an embodiment of the present invention. As shown in FIG. 12, a WAMI:FCS module running at the WAMI:FCS location begins at S10. The WAMI:FCS receives an alert from a WAMI:A that is running at $L_i$ indicating that a WAMI:CS at that location $L_i$ has updated one or more WAMI Collections, at S12. The WAMI:FCS issues a request to the WAMI:A at location $L_i$, to receive a list of WAMI Collection Tree Nodes that were updated by the WAMI:CS at $L_i$, at S14. The WAMI:FCS receives a response from WAMI:A at location $L_i$ with a list of updated Collection Tree Nodes, at S16. The WAMI:FCS then issues a WAMI:CS:GetCollections request to the WAMI:CS running at location $L_i$ to request for all the metadata associated with the Collection Tree Nodes that were just updated, at S18. The WAMI:FCS receives the response and saves or merges the metadata received from the response into a local cache or memory, at S20. If desired, the prior copy of metadata is retained. The WAMI:FCS then marks the local FCS Collection Tree has having been updated, and records the time and date of the update, at S22, and ends at S24. Errors and issues, at each stage in the WAMI:FCS service, if encountered, are handled gracefully by implementations of this method.

Figure 13:
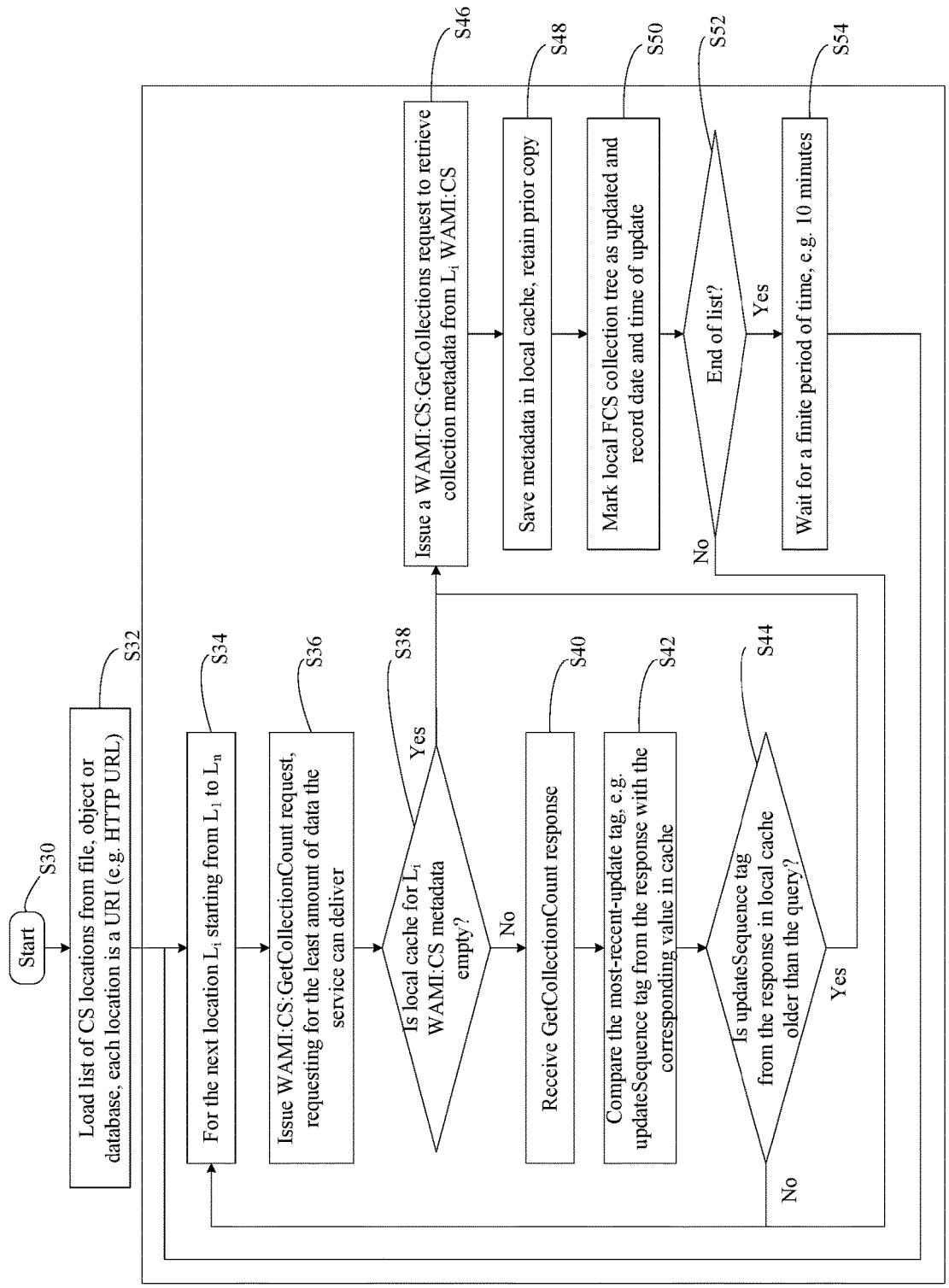
FIG. 13 is a flowchart of an implementation of a Federated WAMI Collection Service (WAMI:FCS) module that periodically localizes WAMI collection metadata from one or more WAMI:CS Locations, according to an embodiment of the present invention.

FIG. 13 is a flowchart of an implementation of a Federated WAMI Collection Service module running at a WAMI:FCS Location $L_j$, that periodically localizes WAMI collection metadata from one or more WAMI:CS running at multiple WAMI:CS locations $L_{1 \ldots N}$, according to an embodiment of the present invention. In the example topology depicted in FIG. 4, a WAMI:CS locations $L_{1 \ldots N}$ would be the Locations $L_1$, $L_2$, $L_3$, $L_4$ and $L_5$. A WAMI:FCS location $L_j$ would be $L_6$. In order for a WAMI:FCS to make a client program believe there is only one WAMI Collection Service, despite there being several WAMI Collection Services under it, a WAMI:FCS needs to aggregate critical WAMI Collection Tree metadata from each WAMI Collection Service under it. The client program queries a WAMI:FCS as if it were a normal WAMI Collection Service. Depending on the request, a WAMI:FCS implementation either delivers the response directly from its locally cached WAMI collection metadata, or by querying any WAMI:CS under it. The method depicted in FIG. 13 creates the local cache.

The flowchart depicted in FIG. 13 is a module within the WAMI:FCS. The method starts at S30. The input to the WAMI:FCS module depicted in FIG. 13 is a list of CS locations that are providing a WAMI:CS. The list can be a text file in a known format, for example XML, or JSON. An example of the list is a set of entries where each entry specifies a WAMI:CS location $L_i$ from $L_{1 \ldots N}$ and includes an HTTP URL to the WAMI:CS instance; a user name and encrypted password; and any additional parameters as needed by the implementation of this method. The WAMI:FCS module loads the list of WAMI:CS locations running WAMI:CS, at S32. For each location $L_i$ starting from $L_1$ to $L_N$, at S34, the method issues a WAMI:CS:GetCollectionCount request, as specified in the WAMI Collection Service web services specification, at S36. If the request ends in error, it is handled elegantly. The WAMI:FCS module checks to see if the local cache contains any metadata associated with $L_i$ (i.e., checks if local cache is not empty), at S38. If it does not contain any metadata (i.e., is empty), the WAMI:FCS module jumps forward to S46. If, on the other hand, the local cache contains metadata associated with $L_i$, then the WAMI:FCS receives the WAMI:CS:GetCollectionCount response, at S40. The WAMI:FCS module checks the value of the updateSequence tag in the response. An updateSequence tag implies a variable that holds a sequence value that can uniquely identify an update to the content being delivered. Such a value enables caching algorithms to identify if the content of the response value is different from the locally cached content. In one embodiment, the value of the updateSequence can be the date and time stamp of the most recent update to the WAMI collection metadata being served by the WAMI:CS at $L_i$. However, in another embodiment, the value can be an arbitrary sequence number unique to each update. In yet another embodiment, the value can be a string of characters that has been encoded to identify a unique update and bears further information that provides enhanced access to the updated metadata. The updateSequence value is compared with the corresponding value in the cache, at S42. Next, the WAMI:FCS module checks whether the updateSequence tag from the response in local cache is older than the query, at S44. If the value of updateSequence tag in the response is the same as the value in the cache, it implies that WAMI Collection information was not modified at location $L_i$. The WAMI:FCS module returns to process the next location, S34. If the values differ, the WAMI:FCS module issues a WAMI:CS:GetCollections request, as specified in the WAMI:CS web services specification, at S46. The WAMI:CS:GetCollections request is sent to the WAMI:CS running $L_i$. Any error is managed elegantly. The metadata received in the response is saved to the local cache and the prior copy is retained, at S48. The local WAMI:FCS Collection Tree Metadata is updated and the time and date of this update is recorded, at S50. The WAMI:FCS module checks to see if $L_N$ is reached, i.e. if the end of the list is reached, at S52. If not, the method continues back at S34. If yes, the WAMI:FCS module waits for a finite period of time (for example, 10 minutes), at S54 and returns to S34.

Figure 14:
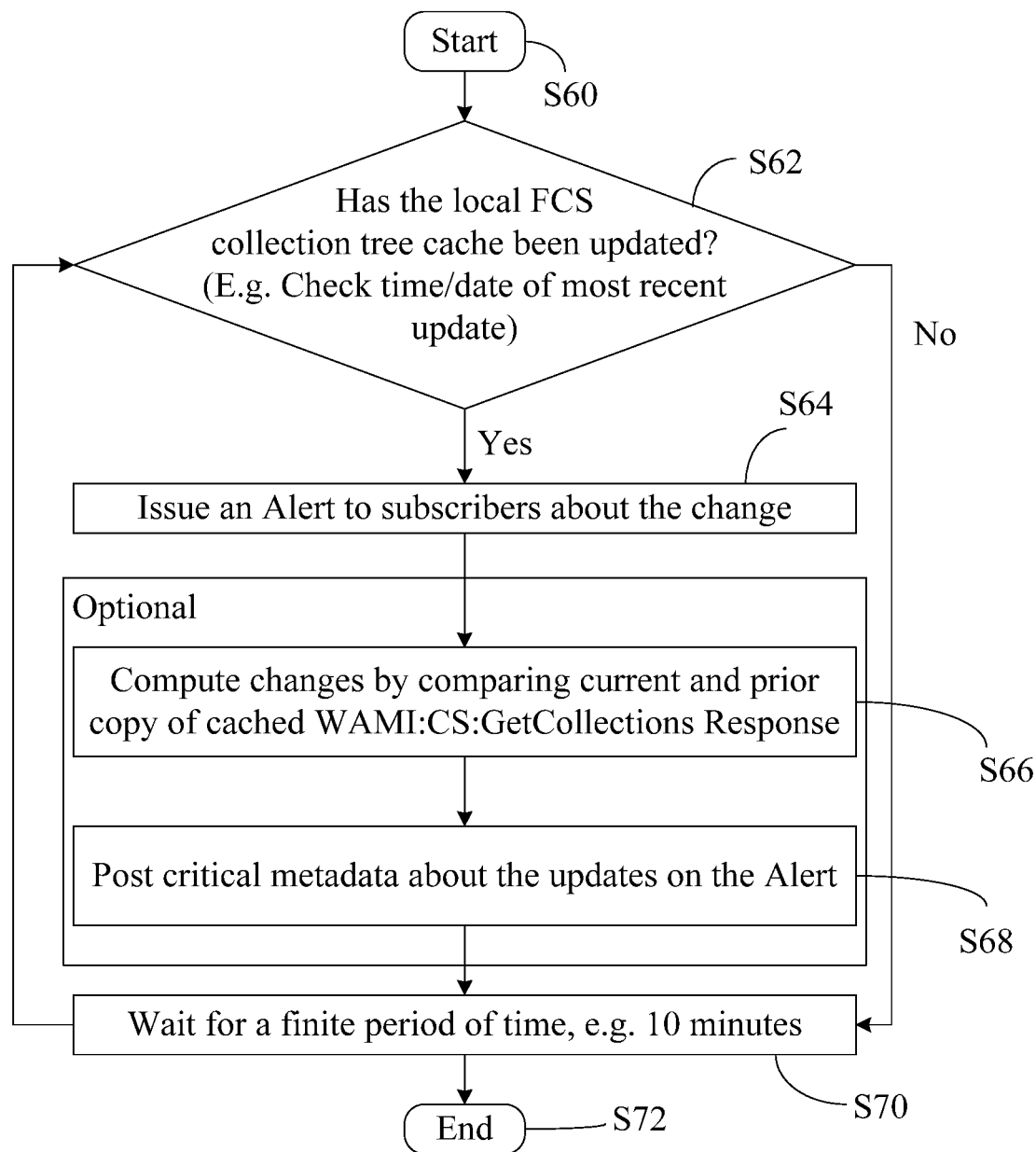
FIG. 14 is a flowchart of an implementation of a Federated WAMI Collection Service (WAMI:FCS) module that alerts any subscribing client programs regarding the fact that something at the WAMI:FCS was updated, according to an embodiment of the present invention.

FIG. 14 is a flowchart of an implementation of an alert module WAMI:A running at a WAMI:FCS Location, and monitoring updates to a Federated WAMI Collection Service (WAMI:FCS) module. The method implements the WAMI:A module as part of the WAMI:FCS to alert any interested subscriber about an update to the WAMI collection metadata at the WAMI:FCS Location, according to an embodiment of the present invention. The WAMI:A alert module implements a known alert specification, for example OGC GeoRSS. As an optional operation, the alert module WAMI:A computes what changed since the last time the WAMI collection metadata at the FCS location was modified. Only the important information about the update such as the name and ID of the Collection that was modified and the date and time of modification are posted as part of the Alert. The WAMI:A alert module then waits for a finite amount of time, for example 10 minutes, and returns to the beginning. According to an embodiment of the present invention, the WAMI:A alert module starts at S60. The method then progresses by performing a test whether a local FCS collection tree cache has been update, for example, by checking a time or a date of most recent update, at S62. If yes, an alert is then issued by WAMI:FCS using the WAMI:A module to subscribers about the change at S64. Otherwise, if no, the local FCS is instructed to wait for a finite period of time, e.g., 10 minutes, at S70 and perform the test again, at S62. After issuing an alert, the WAMI:A alert module may optionally compute changes by comparing the current WAMI:CS:GetCollections response and cached prior copy of the WAMI:CS:GetCollections response, at S68, and the WAMI:A alert module posts critical information about the updates on the alert, at S68. The WAMI:A alert module then ends at S72.

The discovery of WAMI collection metadata and WAMI data in general is a problem whose solution is presented in subsequent methods. Discovering the data implies not explicitly searching for a specific item of data. Instead, discovery implies that an interested and permitted client application browses through the data, making informed decisions to get to the desired data, based on available direction. The discovery of WAMI collection metadata is performed by a client program by accessing data delivered by a web service. The web service presents WAMI collection metadata, being already served by a WAMI:CS in a familiar form that can be ingested by the client application. For example, if Google Earth™ is a client application, and one of the formats in which a WAMI:CS delivers WAMI collection metadata is XML, then a WAMI discovery service would translate the WAMI:CS WAMI collection metadata XML into a KML. Such translation is conventional. Since there are many such WAMI:CS locations, each location would require a WAMI Discovery Service implemented to deliver WAMI collection metadata in KML format. However, a single entry point to all WAMI Discovery Services in KML format is required to ensure a federated web service. A method to generate such a Federated WAMI Discovery Service in KML format, according to one embodiment of the present invention, is further described in the following paragraphs with reference to FIGS. 15 and 16.

Figure 15:
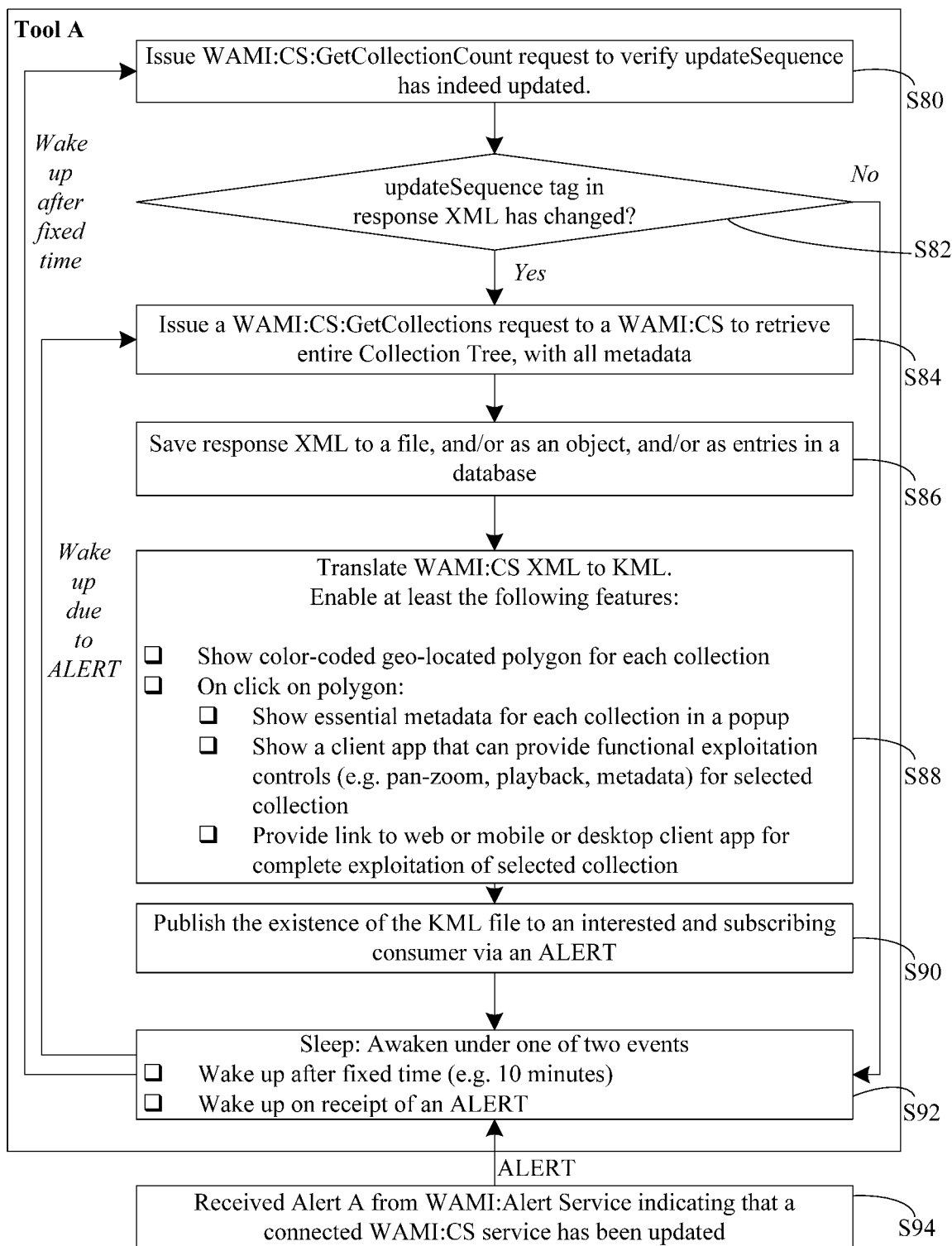
FIG. 15 is a flowchart of an implementation of a module of a Federated WAMI Discovery Service using the KML or KMZ Standard (WAMI:$D_K$) such that the WAMI:$D_K$ module is running at all WAMI:CS locations, to generate a KML or KMZ file comprising of WAMI metadata being served by a WAMI:CS at each WAMI:CS location, either periodically or upon receiving an alert from a WAMI:A running at a WAMI:CS location, according to an embodiment of the present invention.

FIG. 15 is a flowchart of a method of a portion of the Federated WAMI Discovery Service (WAMI:$D_K$). At various stages in the method (WAMI:$D_K$ service), if there is an error reported by the implementation of the method, the error is handled elegantly by the implementation of the method. The method can either be invoked periodically, or it can be invoked via a WAMI:A that is reporting updates to a WAMI:CS at a WAMI:CS Location. The method, upon invocation, checks if a WAMI:CS was indeed updated. If so, it downloads the WAMI collection metadata as being served by the WAMI:CS. The downloaded data is the WAMI Collection Tree. The WAMI Collection Tree is translated into a KML. The KML file is saved at a location from where it can be accessed on the web by a permitted and interested client program. The fact that such a KML was created is published via an Alert. This method is referred to in FIG. 15 as Tool A for a WAMI:$D_K$.

The term XML is used to depict the format in which WAMI:CS Web Service responses deliver WAMI collection metadata. However, the WAMI:CS may respond in any other well-known and well-defined format, for example JSON. The term KML is used throughout the document, and it implies the KML or KMZ format. In one embodiment, Tool A runs at the same location as the WAMI:CS.

When translating from the WAMI Collection Tree delivered by a WAMI:CS to KML, there is a one to one mapping between the WAMI Collection Tree and the generated KML. Each node in a WAMI collection tree translates to a root, internal or leaf node and the edges into a KML-based tree using various KML configurations such as its implicit hierarchy and network links.

As depicted in FIG. 15, the method (Tool A of WAMI:$D_K$) begins at S80 and loops until explicitly terminated. At S80, the method issues a WAMI:CS:GetCollectionCount request. In the response, it checks the updateSequence tag. At S82, the method checks to see if the updateSequence tag in the response has changed since the previous iteration of the method. If no, the method jumps to S92. If yes, the method continues at S84. At S84, the method issues a WAMI:CS: GetCollections request to the WAMI:CS instance to retrieve the entire WAMI Collection Tree Metadata. The response, at S86, whether it is in XML or any other format, is saved to a file or object or entries in a database. The response is translated into KML, at S88. The translation is a one to one mapping of WAMI Collection Tree nodes into KML nodes. A connection to a child node in a WAMI Collection Tree is a network link to a child node's metadata in KML. During the translation, at S88, for a leaf node in the WAMI Collection Tree that maps to a valid WAMI Collection, at least the following information is provided to the client program via the KML:

1. Color coded polygon identifying the geographic bounds of a WAMI Collection.
2. Temporal bounds of the WAMI Collection.
3. Additional metadata that is deemed necessary for the consumer of the KML.
4. A popup balloon capability that displays metadata in a well formed visual format, including but not limited to:
   a. An embedded WAMI data exploitation app that runs within the consuming Client application, if permitted; for example, Google Earth™ would have a popup balloon which would have WAMI metadata and an embedded JavaScript client within the popup balloon.
   b. A link to a WAMI data exploitation app, such as a mobile app or desktop app or web browser based app, running independent of the Client program that is consuming the KML, for example, Google Earth™ would have a popup balloon which would have WAMI metadata and a link to such a WAMI exploitation app.

At S90, the method publishes the existence of the KML file to any interested and subscribing consumers by publishing an alert via a WAMI:A. At S92, the method enters a sleep state. The method awakens by one of two possible events. The first event is the passing for a fixed amount of time, for example 10 minutes. The second even is an alert signal from a WAMI:A indicating that the WAMI:CS for which the KML was created has been updated.

The KML or KMZ file exists at a location from where it can be accessed by other Web Services intending to consume this KML or KMZ. A single WAMI:CS KML can be broken up into one or more KML or KMZ files.

Figure 16:
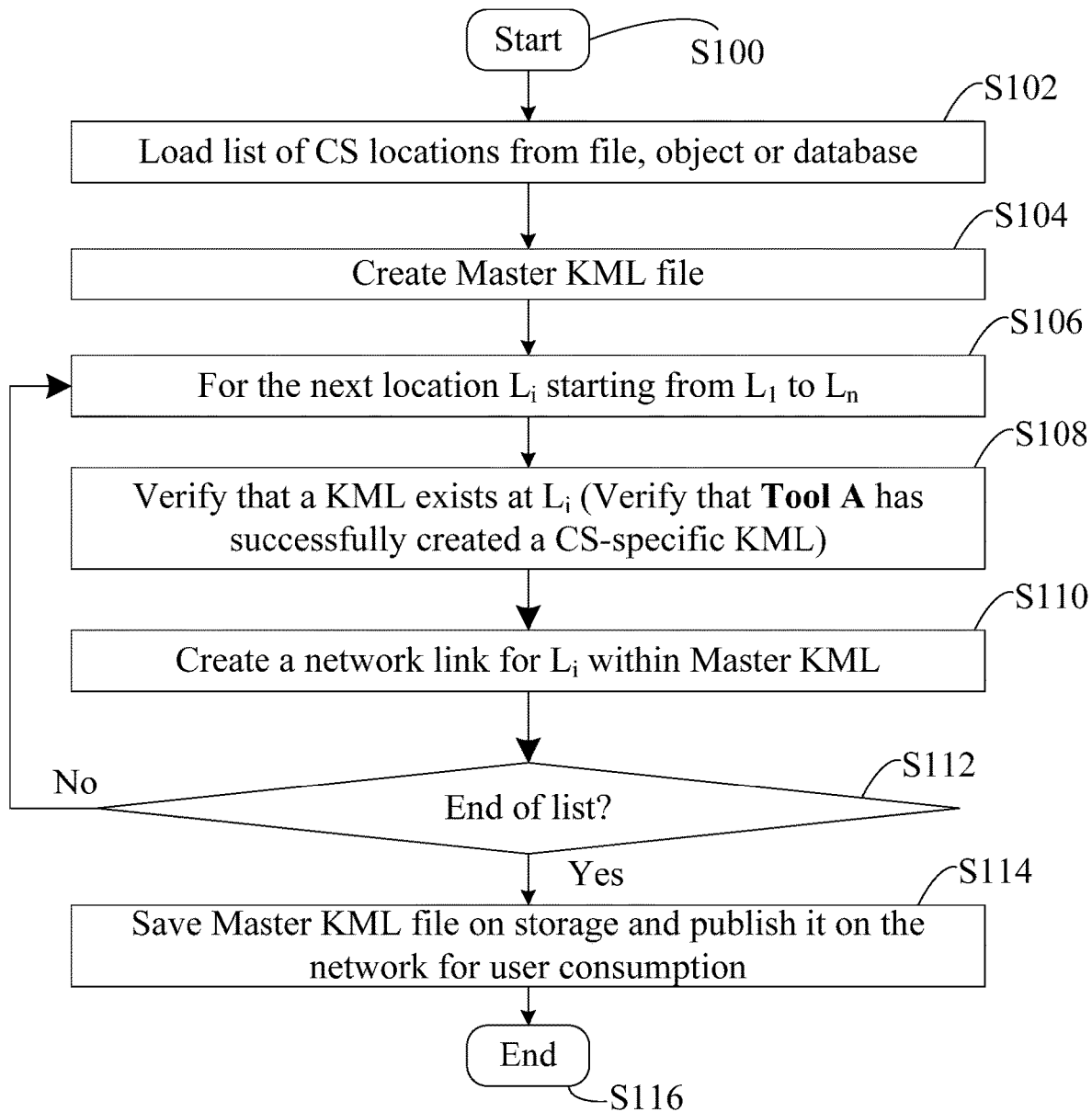
FIG. 16 is a flowchart of an implementation of a module of a Federated WAMI Discovery Service using the KML or KMZ Standard (WAMI:$D_K$) such that the WAMI:$D_K$ module is generating a Master KML or KMZ file at a WAMI:FCS location with network links to KML or KMZ files generated by another module of WAMI:$D_K$ running at another WAMI:CS or WAMI:FCS location, according to an embodiment of the present invention.

FIG. 16 is a flowchart of an implementation of a module of a Federated WAMI Discovery Service WAMI:$D_K$ or method using the KML or KMZ Standard (WAMI:$D_K$) such that the WAMI:$D_K$ module generates a Master KML or KMZ file at a WAMI:FCS location with network links to KML or KMZ files generated by another module Tool A of WAMI:$D_K$ running at another WAMI:CS or WAMI:FCS location, according to an embodiment of the present invention. The method generates a Master KML or KMZ for the entire WAMI Federation being served by the WAMI:FCS location. The WAMI:$D_K$ at the WAMI:FCS location is run every time a new WAMI:CS location is added or removed from the list of WAMI:CS locations that are being federated by this WAMI:FCS location. The method assumes that Tool A of WAMI:$D_K$ is running at each WAMI:CS location being federated by this WAMI:FCS location.

The method (a module of a Federated WAMI Discovery Service WAMI:$D_K$ using the KML or KMZ Standard) starts at S100. The method loads a list of CS locations from a file, object or database, at S102. The method then creates a Master KML file, at S104. For each WAMI:CS location $L_i$, ranging from $L_1$ to $L_N$, the method executes in a loop. The method verifies that a KML or KMZ exists at location $L_i$, at S108. This verifies that Tool A is successfully creating a KML or KMZ file at the location $L_i$, at S108. The method then creates a network link in the master KML or KMZ file, S110. The Network Link points to the KML or KMZ file at location $L_i$. The schema of the Network Link may follow, for example, the OGC KML schema specification. One of the properties of the Network Link is a life span of the link. By setting the life span link, a client program that interprets such a Network Link reloads the KML or KMZ pointed to by the Network Link after the life span time has passed. An example of the life span time is 10 minutes. The method continues to process the next WAMI:CS location $L_{i+1}$ until location $L_N$, at S112. After all locations are processed, the method publishes the Master KML file on the network, for example LAN or Internet, for user consumption, at S114, and then terminates, at S116.

As a consequence of the existence of a WAMI:FCS location running WAMI:FCS and WAMI:$D_K$, a subscribing client C is able to access all WAMI data that exists at all WAMI:CS locations being federated by the WAMI:FCS, without having to transfer a single byte of WAMI data from the source WAMI:CS locations; instead transferring only limited quantity of WAMI metadata from the source WAMI: CS locations.

As a conventional byproduct of federating a set of WAMI: CS through a WAMI:FCS using a federated WAMI:$D_K$, a client program can implement a smart search algorithm to search within the KML files. Using the spatiotemporal metadata within a KML, a client program can direct the process of WAMI data discovery by permitting the user to enter geographic location, such as address or geographic position, and narrowing the time window to filter out undesired WAMI collections. This conventional byproduct, for example, is available in Google Earth™.

Figure 19:
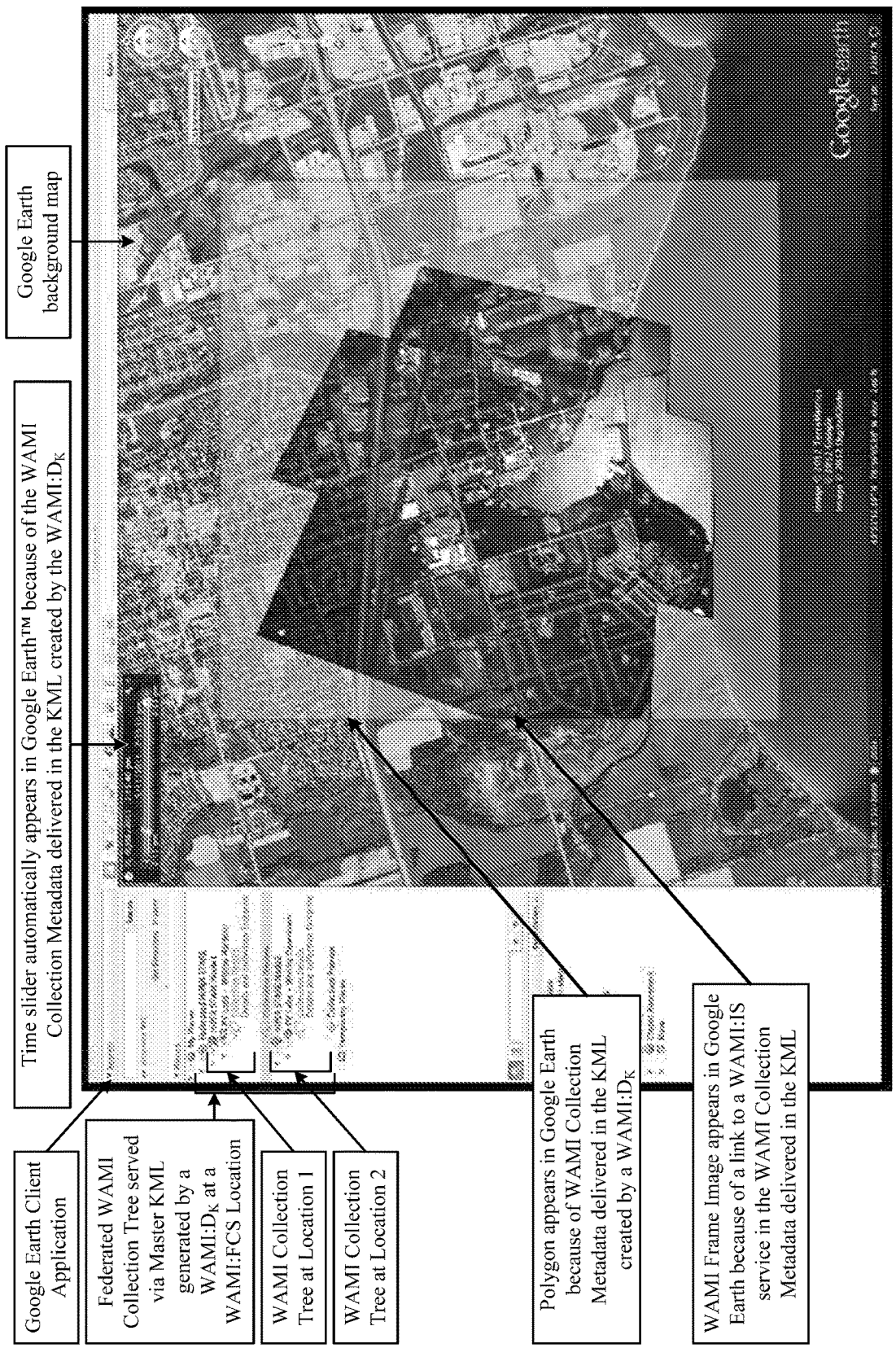
FIG. 19 depicts one example of client program (Google Earth™) visualizing WAMI collection metadata and WAMI data using a fully federated set of KML files generated by a federated WAMI:$D_K$ running at a WAMI:FCS location and a WAMI:$D_K$ running at two geographically separate WAMI:CS locations.

FIG. 19 is an example of Google Earth™ having loaded the Master KML file that was generated by a WAMI:$D_K$ running at a WAMI:FCS Location. The Master KML file provides, amongst other metadata, network links to KML files at two separate geographic locations. Each KML file is generated by a WAMI:$D_K$ running at a WAMI:CS Location. The network link has a lifespan of 10 minutes. The WAMI: $D_K$ at the WAMI:CS Location is recreating the KML file every 10 minutes. As shown in FIG. 19, the Master KML shows a Federated WAMI Collection Tree—aggregating two separate WAMI Collection Trees at two locations. Due to the metadata that is part of the KML, Google Earth™ can create a time slider to filter through the collection tree temporally. Typing an address, location name or location, Google Earth™ can zoom to any location on the globe. In this example, A WAMI Collection is represented by a polygon. Further, due to the metadata generated by WAMI: $D_K$ in the KML file, the user of Google Earth™ can optionally display a single WAMI frame on top of its base map.

Figure 20:
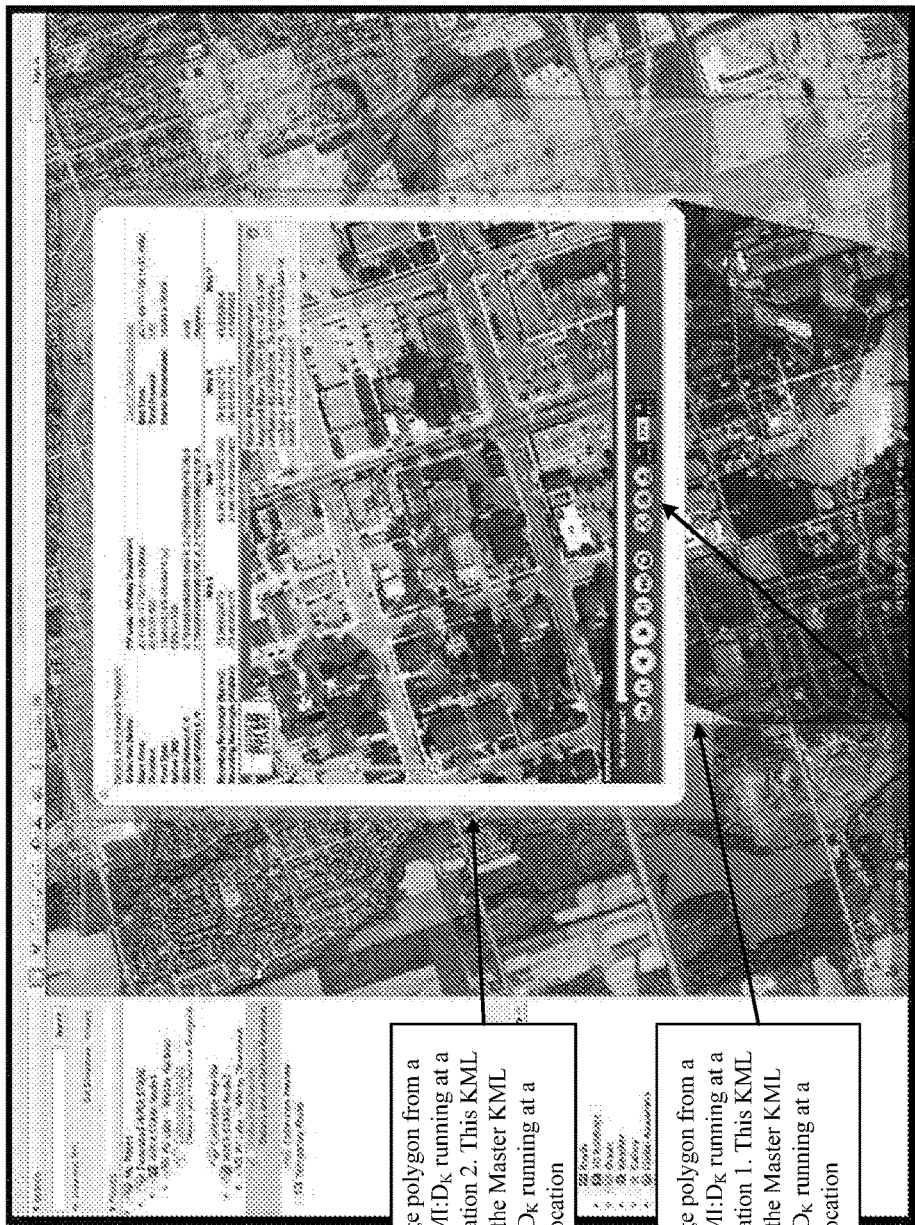
FIG. 20 depicts another example of client program (Google Earth™) visualizing WAMI collection metadata and WAMI data using a fully federated set of KML files generated by a Federated WAMI:$D_K$ running at a WAMI:FCS location and a WAMI:$D_K$ running at two geographically separate WAMI:CS locations.

FIG. 20 is another example of Google Earth™ having loaded the Master KML file that was generated by a WAMI: $D_K$ running at a WAMI:FCS Location. This example shows two WAMI Missions because the time slider included a time window that covered both WAMI Collections. The two WAMI Collections are being served at two separate geographic locations, and are part of two separate WAMI:CS instances. A Google Earth™ user can click on the polygon and popup a balloon to show all the WAMI collection metadata in a well-organized form. The user also has access to a simple limited playback tool to pan-zoom and playback the WAMI Collection.

In FIG. 19 and FIG. 20, the example client program used is Google Earth™ by Google® Inc. Background satellite imagery is ©2012 TerraMetrics®, ©2012 Google, ©2012 DigitalGlobe®. The wide-area motion imagery overlay frame is courtesy of PVLabs Inc. In one embodiment, the frame is used to display an implementation of a WAMI:FCS as a KML service.

In some embodiments, programs for performing the methods or services in accordance with embodiments of the invention can be embodied as program products in a computer such as a personal computer or server or in a distributed computing environment comprising a plurality of computers. The computer may include, for example, a desktop computer, a laptop computer, a handheld computing device such as a PDA, a tablet, etc. The computer program products may include a computer readable medium or storage medium or media having instructions stored thereon used to program a computer to perform the methods described above. Examples of suitable storage medium or media include any type of disk including floppy disks, optical disks, DVDs, CD ROMs, magnetic optical disks, RAMs, EPROMs, EEPROMs, magnetic or optical cards, hard disk, flash card (e.g., a USB flash card), PCMCIA memory card, smart card, or other media. Alternatively, a portion or the whole computer program product can be downloaded from a remote computer or server via a network such as the internet, an ATM network, a WAN or a local area network.

Stored on one or more of the computer readable media, the program may include software for controlling both the hardware of a general purpose or specialized computer or processor. The software also enables the computer or processor to interact with a user via output devices such as a graphical user interface, head mounted display (HMD), etc. The software may also include, but is not limited to, device drivers, operating systems and user applications.

Alternatively, instead or in addition to implementing the methods described above as computer program product(s) (e.g., as software products) embodied in a computer, the method described above can be implemented as hardware in which for example an application specific integrated circuit (ASIC) or graphics processing unit or units (GPU) can be designed to implement the method or methods of the present invention.

The various databases described herein may be, include, or interface to, for example, an Oracle™ relational database sold commercially by Oracle Corporation. Other databases, such as Informix™, DB2 (Database 2) or other data storage, including file-based, or query formats, platforms, or resources such as OLAP (On Line Analytical Processing), SQL (Standard Query Language), a SAN (storage area network), Microsoft Access™ or others may also be used, incorporated, or accessed. The database may comprise one or more such databases that reside in one or more physical devices and in one or more physical locations. The database may store a plurality of types of data and/or files and associated data or file descriptions, administrative information, or any other data.

Although the various steps of the above method(s) are described in the above paragraphs as occurring in a certain order, the present application is not bound by the order in which the various steps occur. In fact, in alternative embodiments, the various steps can be executed in an order different from the order described above.

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

Furthermore, since numerous modifications and changes will readily occur to those of skill in the art, it is not desired to limit the invention to the exact construction and operation described herein. Accordingly, all suitable modifications and equivalents should be considered as falling within the spirit and scope of the invention.

What is claimed is:

1. A method implemented by a computer system of a federated wide area motion imagery (WAMI) collection service (CS) that includes one or more processors configured to execute computer program instructions, the method comprising:
collecting, at a plurality of federated WAMI CS, WAMI collection metadata from a plurality of WAMI CS by:
issuing, over a network by the one or more processors, a request to retrieve WAMI collection metadata from at least one WAMI CS of the plurality of WAMI CS;
receiving, over the network by the one or more processors responsive to the request, the WAMI collection metadata from the at least one WAMI CS; and
storing, by the one or more processors, the WAMI collection metadata at each federated WAMI CS, wherein:
each of the WAMI CS of the plurality of WAMI CS runs at a geographic location, and each federated WAMI CS is in a same location as at least one corresponding WAMI CS of the plurality of WAMI CS, WAMI data is collected and stored by each WAMI CS at its respective geographic location, the WAMI collection metadata indicates one of the geographic locations where the WAMI data is stored, and the WAMI collection metadata is transmitted to each federated WAMI CS; and receiving, over the network by the one or more processors, a request from a client from a plurality of clients to access the stored WAMI data using the stored WAMI collection metadata, wherein each client of the plurality of clients is nearest to a respective one of the federated WAMI CS and the request is transmitted to the nearest federated WAMI CS; and responsive to the client request, providing, to the client by the one or more processors, access to the geographic location of the WAMI CS to retrieve a portion of the WAMI data.

2. The method according to claim 1, wherein the collected WAMI data comprises a set of spatiotemporally related WAMI frames of a geographic region, each of the WAMI frames being at least 5000 pixels by 5000 pixels.

3. The method according to claim 1, further comprising:
organizing, by the one or more processors, the WAMI collection metadata in a tree structure or directed acyclic graph (DAG) such that each root node of each of the at least one WAMI CS becomes an internal node of the organized tree or DAG; and responsive to an alert from a WAMI alert service (A) associated with one of the at least one WAMI CS regarding an update to WAMI data served by the one WAMI CS, marking, by the one or more processors, a local federated collection tree as updated and recording a date and time of the update.

4. The method according to claim 1, wherein the WAMI collection metadata is collected responsive to a time period expiring or responsive to receiving, by the one or more processors, a WAMI data update alert from a WAMI alert service associated with the at least one WAMI CS.

5. The method according to claim 1, further comprising: monitoring, by the one or more processors, a status of the at least one WAMI CS.

6. The method according to claim 1, further comprising:
issuing, by the one or more processors, a request to verify an update sequence tag of the WAMI collection metadata at the at least one WAMI CS, the update sequence tag comprising a date, a time, a number that changes with each update, or a string of characters that changes with each update, or any combination thereof.

7. The method according to claim 1, wherein the federated WAMI CS provides a same functional interface as a WAMI CS, and wherein each of the at least one WAMI CS comprises connection to two or more of a WAMI video service (VS), WAMI image service (IS), WAMI search service (S), WAMI discovery service (D), WAMI alert service (A), and a WAMI ingest service (I), each of the WAMI services being web services.

8. The method according to claim 1, wherein the client indirectly accesses at least some of the at least one WAMI CS via the federated WAMI CS, which in turn accesses the at least some WAMI CSs through another federated WAMI CS of the plurality of federated WAMI CS.

9. The method according to claim 1, wherein the WAMI collection metadata from the first WAMI CS is received in XML or JSON format.

10. A system, comprising: a memory storing instructions executable by one or more processors; and the one or more processors coupled to the memory and operable to execute the instructions such that the one or more processors are configured to:
collect, at a plurality of federated WAMI CS, WAMI collection metadata from a plurality of WAMI CS by:
issuing, over a network by the one or more processors, a request to retrieve WAMI collection metadata from at least one WAMI CS of the plurality of WAMI CS;

receiving, over the network by the one or more processors responsive to the request, the WAMI collection metadata from the at least one WAMI CS; and storing, by the one or more processors, the WAMI collection metadata at each federated WAMI CS, wherein:

each of the WAMI CS of the plurality of WAMI CS runs at a geographic location, and each federated WAMI CS is in a same location as at least one corresponding WAMI CS of the plurality of WAMI CS, WAMI data is collected and stored by each WAMI CS at its respective geographic location, the WAMI collection metadata indicates one of the geographic locations where the WAMI data is stored, and the WAMI collection metadata is transmitted to each federated WAMI CS; and receive, over the network by the one or more processors, a request from a client from a plurality of clients to access the stored WAMI data using the stored WAMI collection metadata, wherein each client of the plurality of clients is nearest to a respective one of the federated WAMI CS and the request is transmitted to the nearest federated WAMI CS; and responsive to the client request, provide, to the client by the one or more processors, access to the geographic location of the WAMI CS to retrieve a portion of the WAMI data.

11. The system according to claim 10, wherein the collected WAMI data comprises a set of spatiotemporally related WAMI frames of a geographic region, each of the WAMI frames being at least 5000 pixels by 5000 pixels.

12. The system according to claim 10, further comprising:
organizing, by the one or more processors, the WAMI collection metadata in a tree structure or directed acyclic graph (DAG) such that each root node of each of the at least one WAMI CS becomes an internal node of the organized tree or DAG; and responsive to an alert from a WAMI alert service (A) associated with one of the at least one WAMI CS regarding an update to WAMI data served by the one WAMI CS, marking, by the one or more processors, a local federated collection tree as updated and recording a date and time of the update.

13. The system according to claim 10, wherein the WAMI collection metadata is collected responsive to a time period expiring or responsive to receiving, by the one or more processors, a WAMI data update alert from a WAMI alert service associated with the at least one WAMI CS.

14. The system according to claim 10, further comprising: monitoring, by the one or more processors, a status of the at least one WAMI CS.

15. The system according to claim 10, further comprising:
issuing, by the one or more processors, a request to verify an update sequence tag of the WAMI collection metadata at the at least one WAMI CS, the update sequence tag comprising a date, a time, a number that changes with each update, or a string of characters that changes with each update, or any combination thereof.

16. The system according to claim 10, wherein the federated WAMI CS provides a same functional interface as a WAMI CS, and wherein each of the at least one WAMI CS comprises connection to two or more of a WAMI video service (VS), WAMI image service (IS), WAMI search service (S), WAMI discovery service (D), WAMI alert service (A), and a WAMI ingest service (I), each of the WAMI services being web services.

17. The system according to claim 10, wherein the client indirectly accesses at least some of the at least one WAMI CS via the federated WAMI CS, which in turn accesses the at least some WAMI CSs through another federated WAMI CS of the plurality of federated WAMI CS.

18. The system according to claim 10, wherein the WAMI collection metadata from the first WAMI CS is received in XML or JSON format.

* * * * *